US012255725B2

United States Patent
Konishi et al.

(10) Patent No.: US 12,255,725 B2
(45) Date of Patent: Mar. 18, 2025

(54) MULTI-FEEDER LINK CONFIGURATION IN HAPS COMMUNICATION SYSTEM AND CONTROL THEREFOR

(71) Applicant: SoftBank Corp., Tokyo (JP)

(72) Inventors: Mitsukuni Konishi, Tokyo (JP); Atsushi Nagate, Tokyo (JP)

(73) Assignee: SoftBank Corp., Tokyo (JP)

( * ) Notice: Subject to any disclaimer, the term of this patent is extended or adjusted under 35 U.S.C. 154(b) by 270 days.

(21) Appl. No.: 17/442,172

(22) PCT Filed: Feb. 12, 2020

(86) PCT No.: PCT/JP2020/005340
§ 371 (c)(1),
(2) Date: Sep. 23, 2021

(87) PCT Pub. No.: WO2020/202817
PCT Pub. Date: Oct. 8, 2020

(65) Prior Publication Data
US 2022/0173794 A1     Jun. 2, 2022

(30) Foreign Application Priority Data
Mar. 29, 2019    (JP) ................................ 2019-066779

(51) Int. Cl.
*H04B 7/185*    (2006.01)
*H04W 16/30*    (2009.01)

(52) U.S. Cl.
CPC ........ *H04B 7/18504* (2013.01); *H04W 16/30* (2013.01)

(58) Field of Classification Search
CPC ............ H04B 7/18504; H04B 7/18515; H04B 7/18517; H04B 7/18513; H04B 7/15;
(Continued)

(56) References Cited

U.S. PATENT DOCUMENTS

| 9,026,042 B1 | 5/2015 | Nemeth et al. |
| 2012/0289225 A1 | 11/2012 | Treesh et al. |

(Continued)

FOREIGN PATENT DOCUMENTS

| CA | 2460491 C | * | 1/2011 | ......... H04B 7/18513 |
| EP | 837569 A2 | * | 4/1998 | ......... H04B 7/18513 |

(Continued)

OTHER PUBLICATIONS

Takafumi Fujii, "A Study on Efficient Spectrum Utilization for Feeder Link using Multipe Gateways in HAPS System," The Institute of Electronics, Information and Communication Engineers, IEICE Technical Report, RCS2018-203, Nov. 2018.

(Continued)

*Primary Examiner* — Khalid W Shaheed
(74) *Attorney, Agent, or Firm* — Muirhead and Saturnelli, LLC

(57) ABSTRACT

It is suppressed of a deterioration of a communication quality of a service link (SL), which is caused by an increase of signal attenuation in a propagation path of a feeder link (FL) between an aerial-staying type communication relay apparatus and a gateway (GW) station. A relay communication station of the communication relay apparatus comprises a FL communication section that performs a feeder-link radio communication with each of a first gateway station and a second gateway station corresponding to a first cell and a second cell which are adjacent to each other, a SL communication section that performs a radio communication with a terminal apparatus in each SL of the first cell and the second cell, and a control section that controls the SL communication section so that a shape of the second cell is changed to include a part or a whole of the first cell, when a radio communication quality in the FL propagation path with the first gateway station corresponding to the first cell (Continued)

is deteriorated or when the deterioration of the radio communication quality is predicted.

9 Claims, 16 Drawing Sheets

(58) Field of Classification Search
CPC .. H04B 7/185; H04B 7/18521; H04B 7/1853; H04B 7/18541; H04W 84/06; H04W 16/28; H04W 16/30; H04W 88/16
See application file for complete search history.

(56) References Cited

U.S. PATENT DOCUMENTS

| | | |
|---|---|---|
| 2013/0109299 A1 | 5/2013 | Roos et al. |
| 2015/0188623 A1 | 7/2015 | Angeletti et al. |
| 2016/0046387 A1 | 2/2016 | Frolov et al. |
| 2016/0134358 A1 | 5/2016 | Jalali et al. |
| 2019/0141591 A1* | 5/2019 | Wu ............... H04W 36/0022 |

FOREIGN PATENT DOCUMENTS

| | | | | |
|---|---|---|---|---|
| FR | 2997251 A1 * | 4/2014 | ......... | H04B 7/18521 |
| JP | 10-190550 A | 7/1998 | | |
| JP | 2003-509951 A | 3/2003 | | |
| JP | 2004-088645 A | 3/2004 | | |
| JP | 2004-128631 A | 4/2004 | | |
| JP | 2005-531225 A | 10/2005 | | |
| JP | 2018-174412 A | 11/2018 | | |
| WO | WO 2015/114715 A1 | 8/2015 | | |
| WO | WO 2015/115356 A1 | 8/2015 | | |

OTHER PUBLICATIONS

Japanese Notification of Reason for Refusal, Dated Feb. 2, 2024.
Japanese Notification of Reason for Refusal, Dated Jun. 19, 2024.
Yohei Shibata, "A Study on Cell Configuration for HAPS Mobile Communications", IEICE Technical Report, General Incorporated Foundation Institute of Electronics, Information and Communication Engineers, Dec. 13, 2018, 118th Volume, No. 372, pp. 101-106.

* cited by examiner

MULTI-FEEDER LINK CONFIGURATION IN HAPS COMMUNICATION SYSTEM AND CONTROL THEREFOR

TECHNICAL FIELD

The present invention relates to a multi-feeder link configuration of an aerial-floating type radio relay apparatus such as a HAPS suitable for constructing a three-dimensional network, and a control therefor.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

SUMMARY OF INVENTION

Technical Problem

If there is a local rainfall or a snowfall in a radio propagation path of a feeder link between the above-mentioned aerial-floating type communication relay apparatus and the GW station on the ground, a flight movement or a rotation of the communication relay apparatus, a maintenance of the GW station, etc., the radio communication quality of the feeder link may be deteriorated, and the communication quality of the service link between the cell corresponding to the feeder link and the communication relay apparatus may be deteriorated.

Solution to Problem

A communication relay apparatus according to an aspect of the present invention is an aerial-staying type communication relay apparatus including a relay communication station for relaying a radio communication between a terminal apparatus and a gateway station. The communication relay apparatus comprises a feeder-link communication section that performs a feeder-link radio communication with each of a first gateway station and a second gateway station corresponding to each of a first cell and a second cell adjacent to each other, a service-link communication section that performs a radio communication with a terminal apparatus in each service link of the first cell and the second cell, and a control section that controls the service-link communication section so that a shape of the second cell is changed to include a part or a whole of the first cell, when a radio communication quality of the feeder link with the first gateway station corresponding to the first cell is deteriorated, or when the deterioration of the radio communication quality is predicted.

In the foregoing communication relay apparatus, the control section may control to stop a transmission to the first cell, after completing a handover of the terminal apparatus connected to the first cell from the first cell to the second cell having the shape changed.

In the foregoing communication relay apparatus, the control section may control the service-link communication section so that the changed shape of the second cell is returned to its original shape, after the deterioration of the radio communication quality is eliminated.

A communication relay apparatus according to another aspect of the present invention is an aerial-staying type communication relay apparatus including a relay communication station for relaying a radio communication between a terminal apparatus and a gateway station. The communication relay apparatus comprises a feeder-link communication section that performs a radio communication with a first gateway station and a second gateway station corresponding to each of a first cell and a second cell formed in a common area, a service-link communication section that performs a radio communication with a terminal apparatus in at least one of the service links of the first cell and the second cell in the common area, and a control section that controls the feeder-link communication section so as to start a communication with the second gateway station, when a radio communication quality of the feeder link with the first gateway station is deteriorated in a status of stopping the communication with the second gateway station, or when the deterioration of the radio communication quality is predicted.

In the foregoing communication relay apparatus, the control section may control the feeder-link communication section so as to stop the feeder link communication with the first gateway station, after starting the feeder link communication with the second gateway station and completing a handover of the terminal apparatus connected to the first cell from the first cell to the second cell.

In the foregoing communication relay apparatus, the deterioration of the radio communication quality of the feeder link with the first gateway station may include the deterioration of the radio communication quality caused by at least one of an increase of signal attenuation due to a rainfall or a snowfall in the feeder-link propagation path, a maintenance operation of the first gateway station, a change in a flight path of the communication relay apparatus and a change in attitude of the communication relay apparatus.

In the foregoing communication relay apparatus, the communication relay apparatus may further comprises an information acquisition section that acquires at least one of information on weather forecast for an area including the propagation path of the feeder link with the first gateway station, maintenance schedule information of the first gateway station, monitoring information including a reception level of the feeder link with the first gateway station, flight path information of the communication relay apparatus, position information of the communication relay apparatus, and attitude information of the communication relay apparatus, and the control section may determine the deterioration of the radio communication quality of the feeder link with the first gateway station based on the information acquired by the information acquisition section.

In the foregoing communication relay apparatus, the communication relay apparatus may further comprise a control-information receiving section that receives control information from a remote control apparatus, and the control section may perform a control based on the control information received by the control-information receiving section.

The communication control apparatus according to yet another aspect of the present invention is a remote control apparatus for remotely controlling the communication relay apparatus.

The communication system according to yet another aspect of the present invention is a communication system including a communication relay apparatus and a remote control apparatus for remotely controlling the communication relay apparatus.

The remote control apparatus comprises an information acquisition section that acquires at least one of weather forecast information on an area including the propagation path of the feeder link with the first gateway station, maintenance schedule information of the first gateway station, monitoring information including a reception level of the feeder link with the first gateway station, flight path information of the communication relay apparatus, position information of the communication relay apparatus, and attitude information of the communication relay apparatus, a control-information generating section that determines the deterioration of the radio communication quality of the feeder link with the first gateway station, and generates control information for controlling the feeder-link communication section and the service-link communication section based on the information acquired by the information acquisition section, and a control-information transmitting section for transmitting the control information to the communication relay apparatus.

Herein, the communication system may further comprise a first base station connected to the first gateway station, and a second base station connected to the second gateway station.

A communication system according to yet another aspect of the present invention comprises the communication relay apparatus, a first base station connected to the first gateway station, and a second base station connected to the second gateway station.

In the foregoing communication system, the first base station and the second base station may perform a process of handing over plural terminal apparatuses connected to the first cell to the second cell in order, after the change of the shape of the second cell is completed or after the feeder link communication between the communication relay apparatus and the second gateway station is started.

In the foregoing communication system, the first base station and the second base station may stop a communication of a user data signal with the terminal apparatus during a processing period of the handover.

A communication method according to yet another aspect of the present invention is a communication method in a relay communication station that is incorporated in an aerial-staying type communication relay apparatus and relays a radio communication between a terminal apparatus and a gateway station. The communication method includes performing a feeder-link radio communication with each of a first gateway station and a second gateway station corresponding to each of a first cell and a second cell adjacent to each other, performing a radio communication with a terminal apparatus in a service link of each of the first cell and the second cell, and changing a shape of the second cell so as to include a part or a whole of the first cell, when a radio communication quality of the feeder link with the first gateway station corresponding to the first cell is deteriorated, or when the deterioration of the radio communication quality is predicted.

A communication method according to yet another aspect of the present invention is a communication method in a relay communication station that is incorporated in an aerial-staying type communication relay apparatus and relays a radio communication between a terminal apparatus and a gateway station. The communication method includes performing a radio communication with a first gateway station and a second gateway station corresponding to each of a first cell and a second cell formed in a common area, performing a radio communication with a terminal apparatus in at least one of the service links of the first cell and the second cell of the common area, and starting a communication with the second gateway station, when a radio communication quality of a feeder link with the first gateway station is deteriorated in a status of stopping the communication with the second gateway station, or when the deterioration of the radio communication quality is predicted.

A program according to yet another aspect of the present invention is a program executed by a computer or a processor installed in a relay communication station that is incorporated in an aerial-staying type communication relay apparatus and relays a radio communication between a terminal apparatus and a gateway station. The program includes a program code for performing a radio communication of feeder link with each of a first gateway station and a second gateway station corresponding to each of a first cell and a second cell adjacent to each other, a program code for performing a radio communication with a terminal apparatus in a service link of each of the first cell and the second cell, and a program code for changing a shape of the second cell so as to include a part or a whole of the first cell, when a radio communication quality of the feeder link with the first gateway station corresponding to the first cell is deteriorated, or when the deterioration of the radio communication quality is predicted.

A program according to yet another aspect of the present invention is a program executed by a computer or a processor installed in a relay communication station that is incorporated in an aerial-staying type communication relay apparatus and relays a radio communication between a terminal apparatus and a gateway station. The program includes a program code for performing a radio communication with a first gateway station and a second gateway station corresponding to each of a first cell and a second cell formed in a common area, a program code for performing a radio communication with a terminal apparatus in at least one of the service links of the first cell and the second cell of the common area, and a program code for starting a communication with the second gateway station, when a radio communication quality of the feeder link with the first gateway station is deteriorated in a status of stopping the communication with the second gateway station, or when the deterioration of the radio communication quality is predicted.

According to the present invention, it is possible to suppress a deterioration of communication quality of a service link, which is caused by an increase of a signal attenuation in a propagation path of a feeder link between an aerial-floating type communication relay apparatus and a gateway station.

DESCRIPTION OF EMBODIMENTS

Hereinafter, embodiments of the present invention are described with reference to the drawings.

Figure 1:
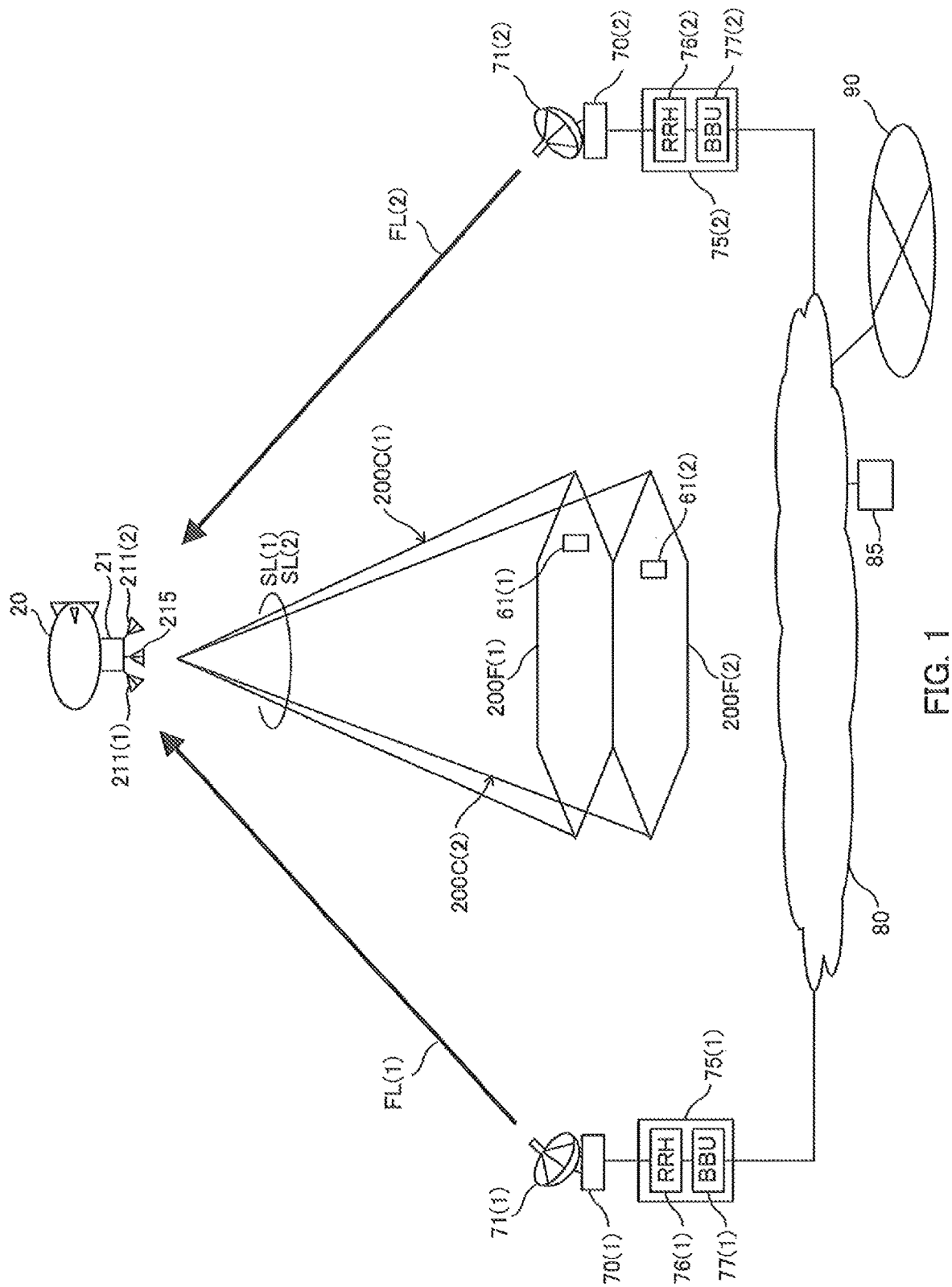
FIG. 1 is an illustration showing an example of a multi-feeder link configuration of HAPS in a communication system according to an embodiment of the present invention.

FIG. 1 is an illustration showing an example of a cell configuration of HAPS 20 in a communication system according to an embodiment of the present invention. The communication system according to the present embodiment is suitable for realizing a three-dimensional network of fifth-generation mobile communication that supports simultaneous connection to a large number of terminal apparatuses, and low delay, etc.

As shown in FIG. 1, the communication system is provided with High-Altitude Platform Stations (HAPS) (also called "high altitude pseudo satellite" or "stratified platform") 20 as plural aerial-floating type communication relay apparatuses (radio relay apparatuses). The HAPS 20 is located in an airspace at a predetermined altitude, and forms three-dimensional cell (three-dimensional area) in a cell-formation target airspace at a predetermined altitude. The HAPS 20 is an airship as a floating object that is controlled by autonomous control or external control so as to float or fly and be located in an airspace (floating airspace) with high altitude of 100 [km] or less from the ground level or the sea level, and a relay communication station 21 is mounted on the airship.

The airspace in which the HAPS 20 is located is, for example, a stratospheric airspace with altitude greater than 11 [km] and less than 50 [km] on the ground (or on the water such as the sea or lake). The airspace may be an airspace in an altitude of 15 [km] or more and 25 [km] or less where weather conditions are relatively stable, and may be an airspace with altitude of about 20 [km] in particular.

The cell-formation target airspace, which is a target airspace for forming a three-dimensional cell with one or two or more HAPSs according to the communication system in the present embodiment, is an airspace in a predetermined altitude range (for example, altitude range of 50 [m] or more and 1000 [m] or less) located between the airspace where the HAPS 20 is located and a cell-formation spatial area near the ground level covered by a base station (for example, LTE eNodeB) such as a conventional macro-cell base station.

It is noted that, the cell-formation target airspace where the three-dimensional cell in the present embodiment is formed may be an airspace over the sea, a river, or a lake. Further, the three-dimensional cell formed by the HAPS 20 may be formed so as to reach the ground level or the sea level so that it can communicate with a terminal apparatus 61 located on the ground or on the sea.

The relay communication station 21 of the HAPS 20 forms plural beams for wirelessly communicating with the terminal apparatus 61 that is a mobile station, toward the ground by an antenna for service link (hereinafter referred to as "SL antenna") 215. The terminal apparatus 61 may be a communication terminal module incorporated in a drone that is an aircraft such as a small helicopter capable of remotely steering, or may be a user apparatus used by a user in an airplane. Areas through which the beam passes in the cell-formation target airspace are a first cell 200C(1) and a second cell 200C(2), which are three-dimensional cells, respectively. The terminal apparatus 61(1) in the figure is located in the first cell 200C(1), and the terminal apparatus 61(2) is located in the second cell 200C(2). Plural beams adjacent to each other forming each of the three-dimensional first cell 200C(1) and the second cell 200C(2) in the cell-formation target airspace may be partially overlapped.

The relay communication station 21 of the HAPS 20 is, for example, a slave repeater that wirelessly communicates with plural gateway stations (also called "feeder station", hereinafter referred to as "GW station") 70(1) and 70(2) as a relay station (master repeater) connected to plural first base station 75(1) and second base station 75(2) on the ground (or on the sea) side. The relay communication station 21 is connected to a core network 80 of a mobile communication network via the first GW station 70(1), the second GW station 70(2), the first base station 75(1) and the second base station 75(2), which are installed on the ground or on the sea, capable of radio communication by antennas for feeder link (hereinafter referred to as "FL antenna") 211(1) and 211(2). The GW stations 70(1) and 70(2) are located at different points from each other on the ground or on the sea. Further, a communication of feeder link between the relay communication station 21 of the HAPS 20 and the GW stations 70(1) and 70(2) may be performed by a radio communication using a radio wave such as a microwave, or may be performed by an optical communication using a laser light or the like.

The plural GW stations 70(1) and 70(2) may control their own antennas (hereinafter referred to as "GW antennas")

71(1) and 71(2) so as to track the HAPS 20 moving in the airspace, respectively. By tracking the HAPS 20 on each of the GW antennas 71(1) and 71(2), even when the GW antennas 71(1) and 71(2) having high directivity such as a parabolic antenna are used, deterioration of the communication quality of the feeder link due to the movement of the HAPS 20 can be suppressed.

As a control system of directional beams of the GW antennas 71(1) and 71(2), various kinds of systems such as a gimbal system, an electric system (360-degrees beamforming control system), and an electric system (angle-limited beamforming control system+antenna switching) can be used.

Each of the first base station 75(1) and the second base station 75(2) is composed of, for example, in the case of LTE eNodeB, remote radio heads (RRH (Remote Radio Head), also called RRU (Remote Radio Unit)) 76(1) and 76(2) and base band units (BBU (Base Band Unit)) 77(1) and 77(2). Each of the RRH 76(1) and 76(2) and the BBU 77(1) and 77(2) may be connected by an optical fiber line and disposed apart from each other. Further, the plural BBU 77(1) and 77(2) may be gathered and established in one place.

Each of the RRH 76(1) and 76(2) is provided with, for example, an orthogonal modulation/demodulation section, a transmission section, a reception section, a power amplifier (PA (Power Amplifier)), and a low noise receiver (LNA (Low Noise Amplifier)), and is connected to the GW stations 70(1) and 70(2). The orthogonal modulation/demodulation section performs orthogonal modulation/demodulation of the OFDM signal processed by the BBU and converts it into an analog signal (RF signal). The transmission section converts the frequency of the RF signal generated by the orthogonal modulation/demodulation section into a frequency to be transmitted as a radio wave. The reception section converts the frequency of the high-frequency signal of the received radio wave into a frequency processed by the orthogonal modulation/demodulation section. The power amplifier (PA) power-amplifies the RF signal generated by the transmission section. The low noise receiver (LNA) amplifies the received weak radio waves and passes them to the reception section.

Each of the BBU 77(1) and 77(2) includes, for example, a base-station control section, a transmission-line interface section, a timing control section and a baseband section, and is connected to the core network 80 of the mobile communication network via a predetermined interface (for example, the S1 interface). The base-station control section controls the entire base station and performs call control protocols and control monitoring. The transmission-line interface section is connected to a packet transmission line such as Ethernet (registered trademark) between the core network or the like, and processes a predetermined protocol to send and receive IP packets. The timing control section generates various kinds of clocks to be used inside the base station based on a reference clock extracted from the signal received via the packet transmission path or the GNSS (Global Navigation Satellite System) received signal from the artificial satellite. The baseband section converts (modulates and demodulates) the IP packet sent and received through the transmission-line interface section and the OFDM signal (baseband signal) which is a radio signal.

Each of the HAPS 20 may autonomously control a floating movement (flight) of HAPS itself and a process in the relay communication station 21 by executing a control program with a control section including a computer or the like incorporated inside of the HAPS. For example, each of the HAPS 20 may acquire current position information of the HAPS itself (for example, GPS position information), position control information (for example, flight schedule information) stored in advance, position information of another HAPS located in a peripheral space or the like, and may autonomously control floating movement (flight) and process in the relay communication station 21 based on these pieces of information.

Further, the floating movement (flight) of each of the plural HAPS 20 and the process in the relay communication station 21 may be controlled by a central control server 85 as a remote control apparatus provided in a communication center or the like connected to the core network 80 of the mobile communication network. The central control server 85 can be configured by, for example, a computer apparatus such as a PC, a server, or the like. In this case, the HAPS 20 includes a control communication section (for example, a mobile communication module) described later for receiving control information from the central control server 85 and transmitting various kinds of information such as monitoring information to a predetermined destination such as the central control server 85. The control communication section may be assigned terminal identification information (for example, IP address, telephone number, etc.) so that it can communicate with the central control server 85. The MAC address of the communication interface may be used to identify the control communication section of the HAPS 20.

Transmission/reception of control information and monitoring information between the HAPS 20 and the central control server 85 can be performed, for example, via an LTE communication line via the core network 80 of the mobile communication network, the base station 75, and the GW station 70. Further, the transmission/reception of control information and monitoring information may be performed using a satellite-communication line for mobile communication via an artificial satellite, or may be performed using a satellite-communication line via the Internet 90 and an artificial satellite.

The monitoring information transmitted from the HAPS 20 may include at least one of information regarding the floating movement (flight) of HAPS itself or a surrounding HAPS and/or the process at the relay communication station 21, monitoring information including the reception level at which the HAPS 20 measured the received power of the feeder link with the GW station 70, and information such as information on statuses of the HAPS 20 and observation data acquired by various kinds of sensors and the like. Further, the monitoring information may include at least one of information on current positions, attitude information, flight route information (flight schedule information, flight-route history information), velocity relative to the air, velocity relative to the ground and propulsion direction of the HAPS 20, wind velocity and wind direction of the airflow around the HAPS 20, and atmospheric pressure and temperature around the HAPS 20. The control information may include information on a target flight route of the HAPS 20.

The HAPS 20 and the central control server 85 may acquire weather forecast information for an area, including a radio propagation path of a feeder link, maintenance schedule information of the GW station 70 or the base station 75, reception-level monitor information of the feeder link with the GW station 70 measured by the HAPS 20, flight path information of the HAPS 20, and current position information and attitude information of the HAPS 20. These pieces of information may be acquired, for example, from the server of the core network (mobile communication network) 80 or the server of the Internet 90 that manages each piece of information. Further, the central control server 85 may acquire the maintenance schedule information of the GW station 70 or the base station 75 from the GW station 70 or the base station 75 via the core network 80 of the mobile communication network by a predetermined interface (for example, the S1 interface of the LTE), or may acquire the maintenance schedule information from the management server that manages the GW station 70 or the base station 75.

Duplex methods of uplink and downlink for radio communication with the relay communication station 21 and the terminal apparatus 61 are not limited to specific methods, and may be, for example, a time division duplex method (Time Division Duplex: TDD) or a frequency division duplex method (Frequency Division Duplex: FDD). An access method for radio communication with the relay communication station 21 and the terminal apparatus 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time/same frequency, and may be an MU-MIMO (Multi-User MIMO) technology in which one base station transmits signals to plural different communication terminal apparatuses on the same time/same frequency.

It is noted that, in the following embodiments, although it is illustrated and described regarding some cases in which a communication relay apparatus having the relay communication station 21 that wirelessly communicates with the terminal apparatus 61 is an unmanned airship type HAPS 20, the communication relay apparatus may be a solar-plane type HAPS. Further, the following embodiments can be similarly applied to aerial-floating type communication relay apparatuses other than the HAPS.

Links between the HAPS 20 and the base stations 75(1) and 75(2) via each of the GW stations 70(1) and 70(2) are referred to as "feeder links" FL(1) and FL(2), and links between the HAPS 10 and each of the terminal apparatuses 61(1) and 61(2) are referred to as "service links" SL(1) and SL(2). In particular, a spatial section between the HAPS 20 and the GW station 70 is referred to as a "radio section of feeder link". Further, a downlink of a communication from the GW station 70 to the terminal apparatus 61 via the HAPS 20 is also referred to as a "forward link", and an uplink of a communication from the terminal apparatus 61 to the GW station 70 via the HAPS 20 is also referred to as a "reverse link".

In FIG. 1, although the HAPS 20 is located, for example, in the stratosphere with an altitude of about 20 km, the HAPS 20 forms plural cells 200C(1) and 200C(2), and the footprints 200F(1) and 200F(2) of the cells 200C(1) and 200C(2) of the plural cells (2 cells) configuration become a service area on the ground (or on the water such as the sea or lake), it is not limited to these configurations. For example, the number of cells formed by the HAPS 20 may be 3 or more. Each of the plural cells 200C(1) and 200C(2) may be further configured with plural sector cells. That is, the service link SL(1) may support the cell 200C(1) including plural sector cells, and the service link SL(2) may support the cell 200C(2) including other plural sector cells.

Figure 2:
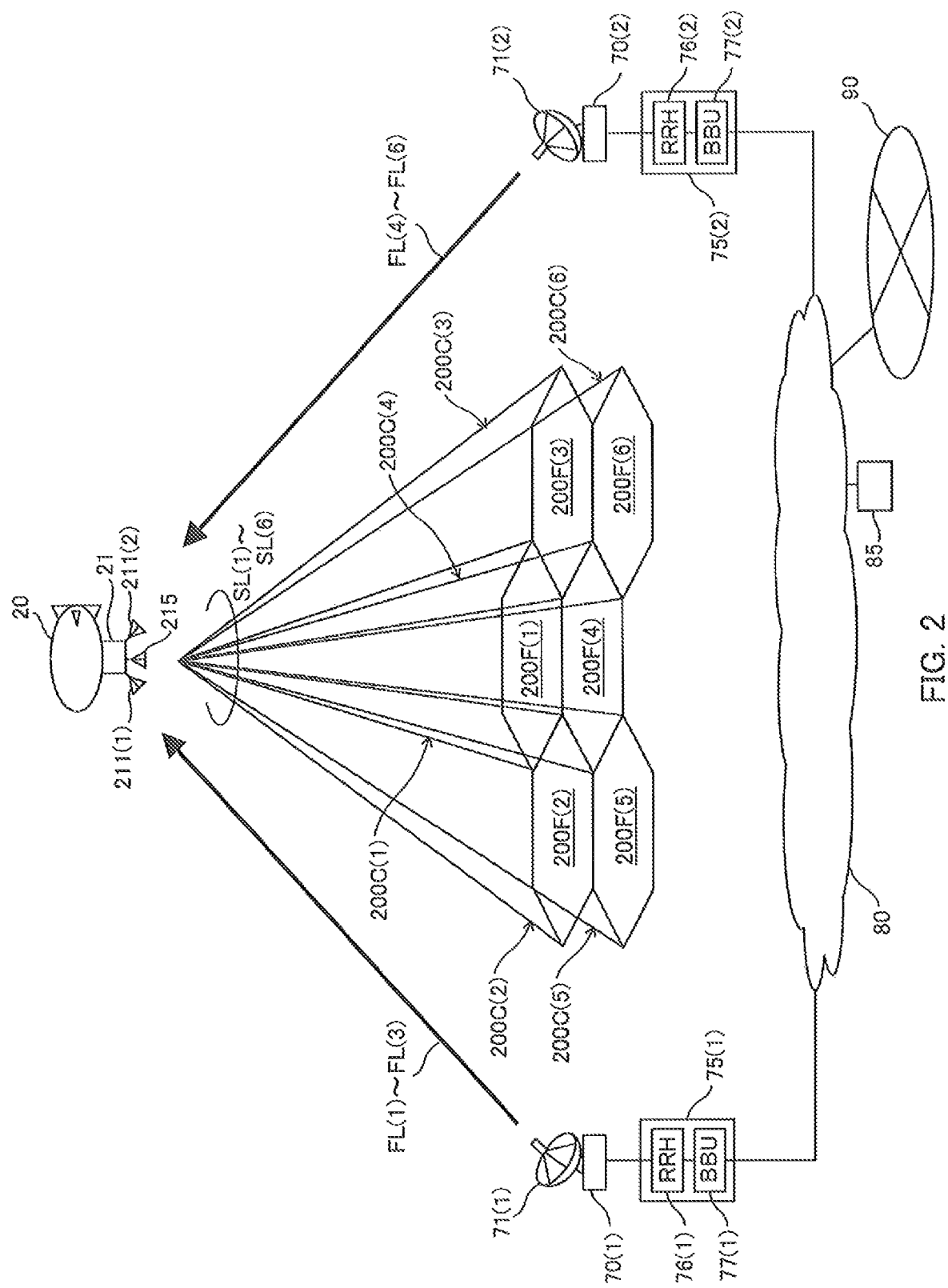
FIG. 2 is an illustration showing another example of a cell configuration of HAPS in the communication system according to the embodiment.
Figure 3:
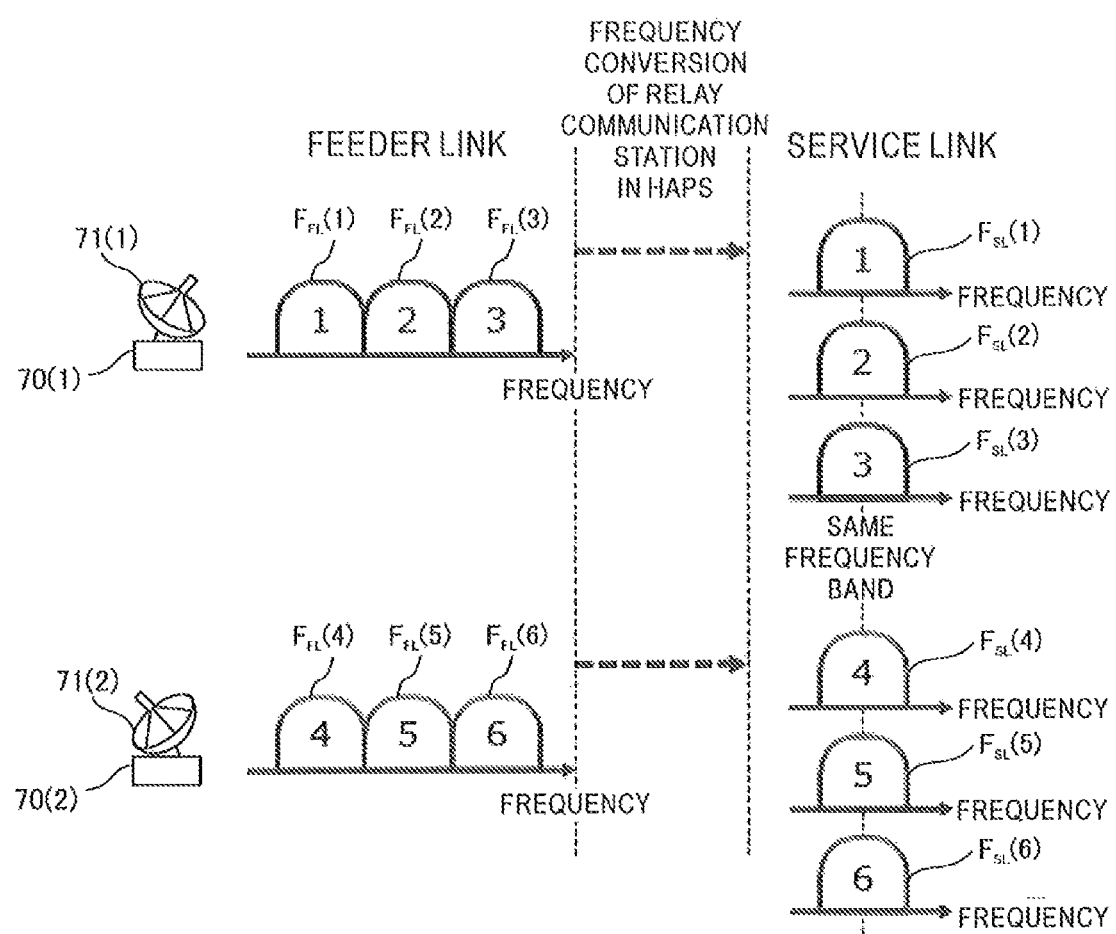
FIG. 3 is an illustration of a frequency arrangement of a feeder link and a service link in the cell configuration of FIG. 2.

FIG. 2 is an illustration showing another example of a cell configuration of the HAPS 20 in the communication system according to the embodiment, and FIG. 3 is an illustration of a frequency arrangement of a feeder link and a service link in the cell configuration of FIG. 2. The example in FIG. 2 has a 6-cell configuration, and a first feeder link FL(1) via a first GW station 70(1) supports the service links SL(1) to SL(3) of three cells 200C(1) to 200C(3) (physical cell ID=1 to 3). Further, a second feeder link FL(2) via a second GW station 70(2) supports the service links SL(4) to SL(6) of other three cells 200C(4) to 200C(6) (physical cell ID=4 to 6) adjacent to the above three cells.

As shown in FIG. 3, frequency bands $F_{SL}(1)$ to $F_{SL}(6)$ of the service links SL(1) to SL(6) of each cell 200C(1) to 200C(6) are generally set in the same frequency band. On the other hand, frequency bands $F_{FL}(1)$ to $F_{FL}(6)$ of the feeder links FL(1) and FL(2) are arranged so as to be orthogonal on the frequency axis, according to the number of cells deployed in the service link. Therefore, the band of the feeder link tends to be exhausted, by which the number of cells of the service link may be limited.

In the present embodiment, as exemplified in FIG. 1 to FIG. 3, by spatially multiplexing the feeder links by the GW stations 70(1) and 70(2) disposed at plural points, it is possible to increase a communication capability (capacity) while keeping the bandwidth of the feeder link constant, and it is possible to increase the number of cells of the service link as shown in FIG. 2 and FIG. 3.

In the communication system of the present embodiment having the aforementioned configuration, if there is a local rainfall or a snowfall in the radio propagation path of the feeder link FL between the HAPS 20 and the plural GW stations 70, a flight movement or a rotation of the HAPS 20, a maintenance of the GW station 70 and the base station 75, and the like, the radio communication quality of the feeder link FL may be deteriorated, and the communication quality of the service link SL between the cell and the HAPS 20 corresponding to the feeder link may be deteriorated.

Figure 4:
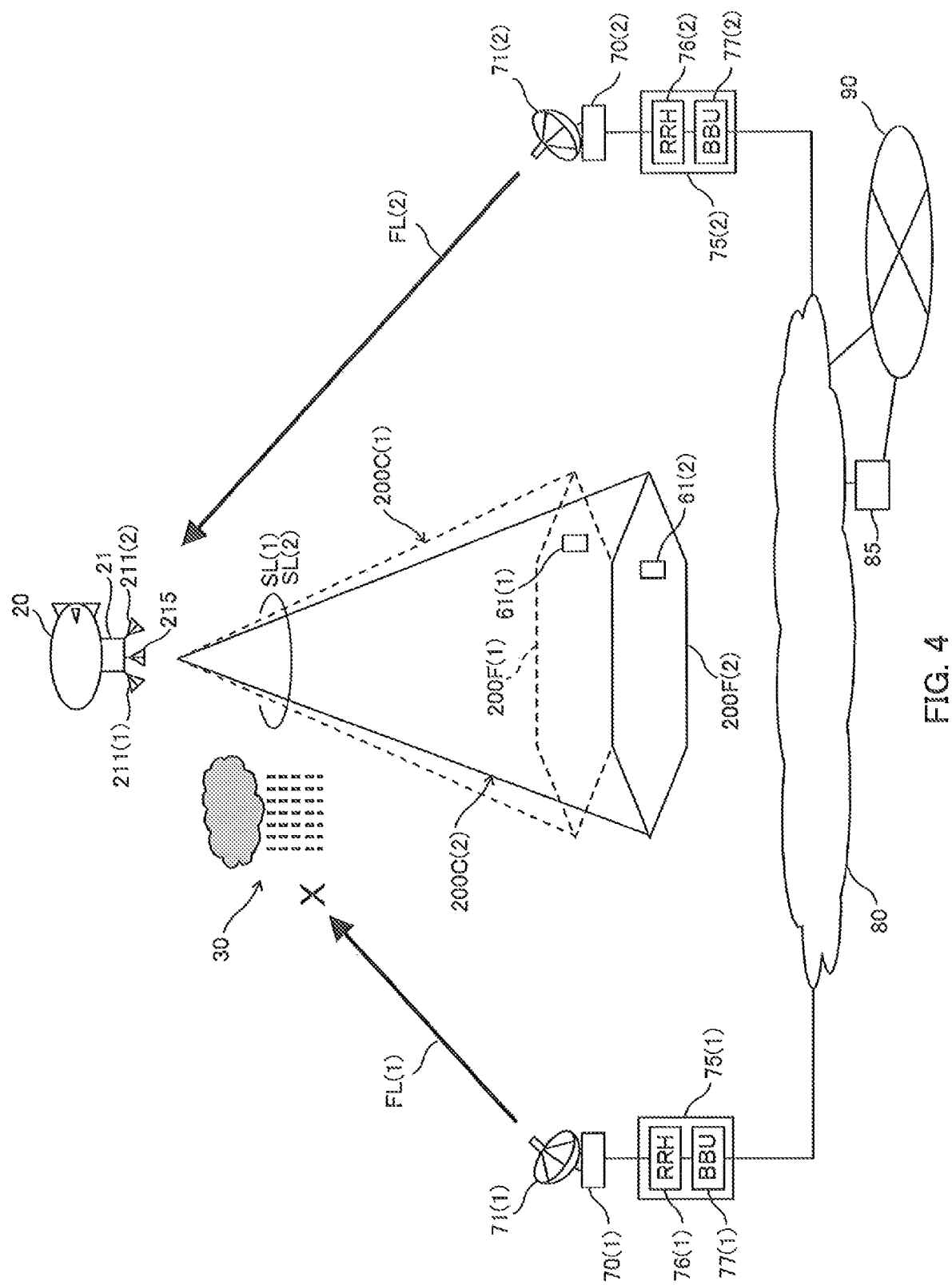
FIG. 4 is an illustration showing an example of an influence of a local rainfall in the feeder link of the multi-feeder link configuration of HAPS.

For example, as shown in FIG. 4, when a local rainfall 30 occurs in the radio propagation path of the feeder link FL(1) between the HAPS 20 and the first GW station 70(1), the signal attenuation in the radio propagation path of the feeder link FL(1) may increase and the radio communication quality may be deteriorated, and the communication quality of the service link SL(1) between the cell 200C(1) and the HAPS 20 corresponding to the feeder link FL(1) may be deteriorated. The deterioration of the radio communication quality of the feeder link may occur not only by the increase in the signal attenuation due to the rainfall or the snowfall in the radio propagation path of the feeder link, but also by the maintenance operation of the GW station, the change in the flight path of the HAPS 20, the change in the attitude of the HAPS 20, etc.

Therefore, when a radio communication quality of the feeder link FL(1) with the first GW station 70(1) corresponding to the first cell 200C(1) is deteriorated, or when the deterioration of the radio communication quality is predicted, the HAPS 20 controls so that a shape of the second cell 200C(2) is changed to include a part or a whole of the first cell 200C(1) in the present embodiment. Further, in other embodiments described below, when a radio communication quality of the feeder link FL(1) with the first GW station 70(1) for normal use is deteriorated in a status of stopping a communication with the second GW station 70(2) for backup, or when the deterioration of the radio communication quality is predicted, the HAPS 20 controls to start the communication with the second GW station 70(2) for backup. By any one of these controls, even when the radio communication quality of the feeder link FL(1) with the first GW station 70(1) is deteriorated, or even when the deterioration of the radio communication quality is predicted, the communication quality of the service link SL(1) between the terminal apparatus 61(1) and the HAPS 20 can be maintained by performing a handover to the second cell 200C(2) for the terminal apparatus 61(1) that is located in the first cell 200C(1) and connected to the first cell 200C(1).

Figure 5:
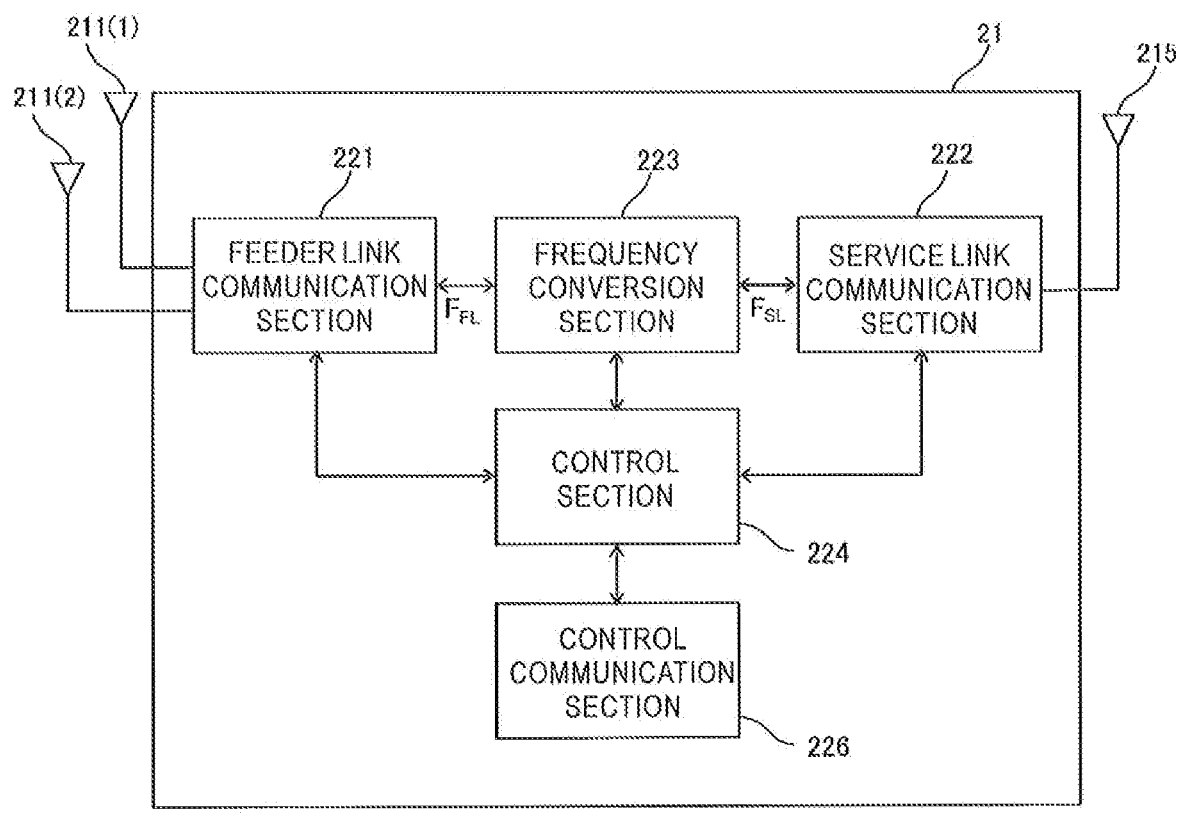
FIG. 5 is a block diagram showing an example of a main configuration of a relay communication station of HAPS according to the embodiment.

FIG. 5 is an illustration showing an example of a main configuration of the relay communication station 21 of the HAPS 20 according to the embodiment. In FIG. 5, the relay communication station 21 is provided with a feeder-link communication section 221, a service-link communication section 222, a frequency conversion section 223, a control section 224 that controls each section, and a control communication section 226.

The feeder-link communication section 221 transmits and receives a radio signal of the feeder link frequency $F_{FL}$ to and from the GW station 70 via the FL antennas 211(1) and 211(2). The number (N) of FL antennas 211 and the number (N) of GW stations 70 are the same (2 in the illustrated example), respectively, and plural FL antennas 211(1) and 211(2) are provided so as to have a one-to-one correspondence with the GW stations 70(1) and 70(2).

The service-link communication section 222 transmits and receives a radio signal of the service link frequency $F_{SL}$ to and from the terminal apparatus 61 via the SL antenna 215. The SL antenna 215 is provided with a beam former that forms a beam of the service link, and a shape of the cell 200C of the service link can be arbitrarily changed. The number (N) of SL antennas 215 and the number (N) of GW stations 70 are the same (2 in the illustrated example), respectively, and plural SL antennas 215 are provided so as to have a one-to-one correspondence with the GW stations 70(1) and 70(2).

The control section 224 may control the FL antennas 211(1) and 211(2) so as to track the GW stations 70(1) and 70(2). By the FL antennas 211(1) and 211(2) tracking the GW stations 70(1) and 70(2), it is possible to suppress the deterioration of the communication quality of the feeder link, which is caused by the movement of the HAPS 20. As a control system of directional beams of the plural FL antennas 211(1) and 211(2), various kinds of systems such as a gimbal system, an electric system (360-degrees beamforming control system), and an electric system (angle-limited beamforming control system+antenna switching) can be used.

The frequency conversion section 223 performs a frequency conversion between the feeder link frequency $F_{FL}$ and the service link frequency $F_{SL}$, between the feeder-link communication section 221 and the service-link communication section 222. The radio signal relayed by the relay communication station 21 may be transmitted and received using, for example, an OFMDA communication method conforming to the LTE or LTE-Advanced standard.

The control section 224 can control each section by executing a program incorporated in advance. For example, when a radio communication quality of the feeder link FL(1) with the first GW station 70(1) corresponding to the first cell 200C(1) is deteriorated or when the deterioration of the radio communication quality is predicted, the control section 224 controls the service-link communication section 222 so that a shape of the second cell 200C(2) is changed to include a part or a whole of the first cell 200C(1). Further, when a radio communication quality of the feeder link FL(1) with the first GW station 70(1) for normal use is deteriorated in a status of stopping the communication with the second GW station 70(2) for backup, or when the deterioration of the radio communication quality is predicted, the control section 224 controls the feeder-link communication section 221 so as to start a communication with the foregoing second GW station 70(2) for backup.

The control communication section 226, for example, is configured with a mobile communication module having a communication function of the LTE or the next generation (for example, the 5th generation), a satellite communication function or both communication functions, and is assigned terminal identification information (for example, IP address, telephone number, etc.) so that it can communicate with the central control server 85. The MAC address of the communication interface may be used to identify the control communication section 226.

Figure 6:
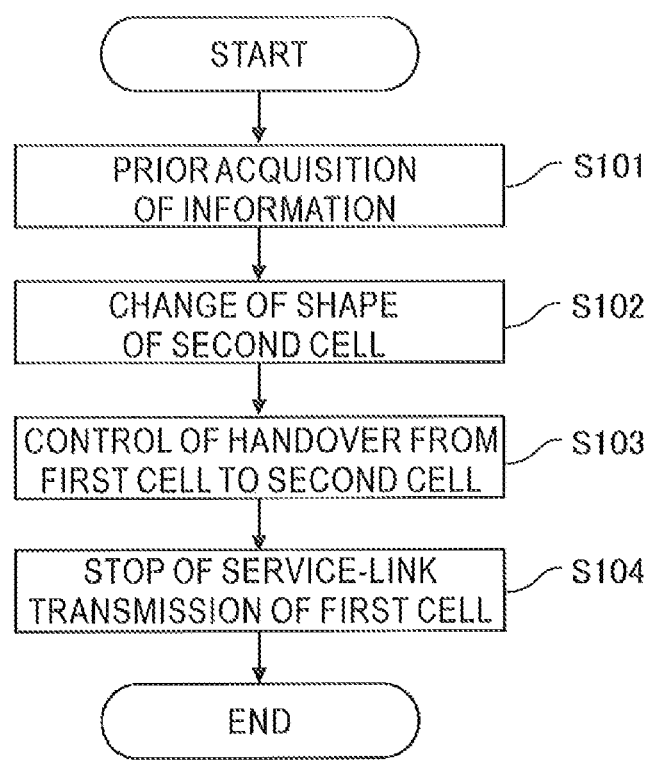
FIG. 6 is a flowchart showing an example of a cell shape control of a service link in a HAPS according to the embodiment.

FIG. 6 is a flowchart showing an example of a cell shape control of a service link in the HAPS 20 according to the embodiment. It is noted that, although the cell shape control of the service link in the HAPS 20 is performed remotely from the central control server 85 in the example of FIG. 6, the HAPS 20 itself may autonomously control the cell shape control.

Figure 7:
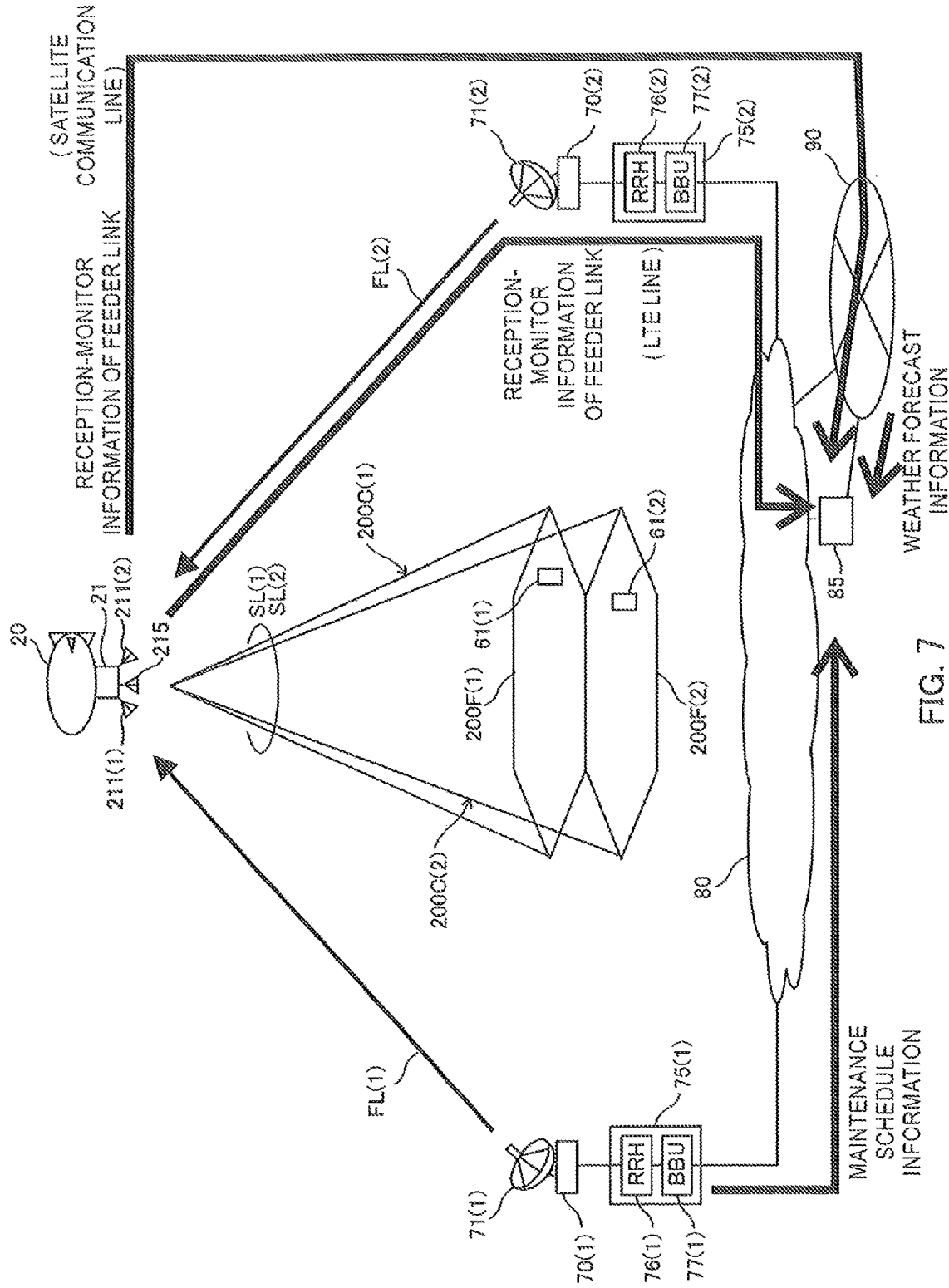
FIG. 7 is an illustration showing an example of a prior acquisition of information in the control example of FIG. 6.

In FIG. 6, the central control server 85 acquires monitoring information regarding the communication quality of the feeder links exemplified in the following (I1) to (I3) periodically or non-periodically at a predetermined timing (S102, see FIG. 7).

(I1) Weather forecast information for the area including the radio propagation paths of feeder links FL(1) and FL(2).

(I2) Maintenance schedule information of the GW stations 70(1) and 70(2) and the base stations 75(1) and 75(2).

(I3) Reception-level monitoring information of the feeder links FL(1) and FL(2) between the GW stations 70(1) and 70(2), which is measured by the HAPS 20.

Figure 8:
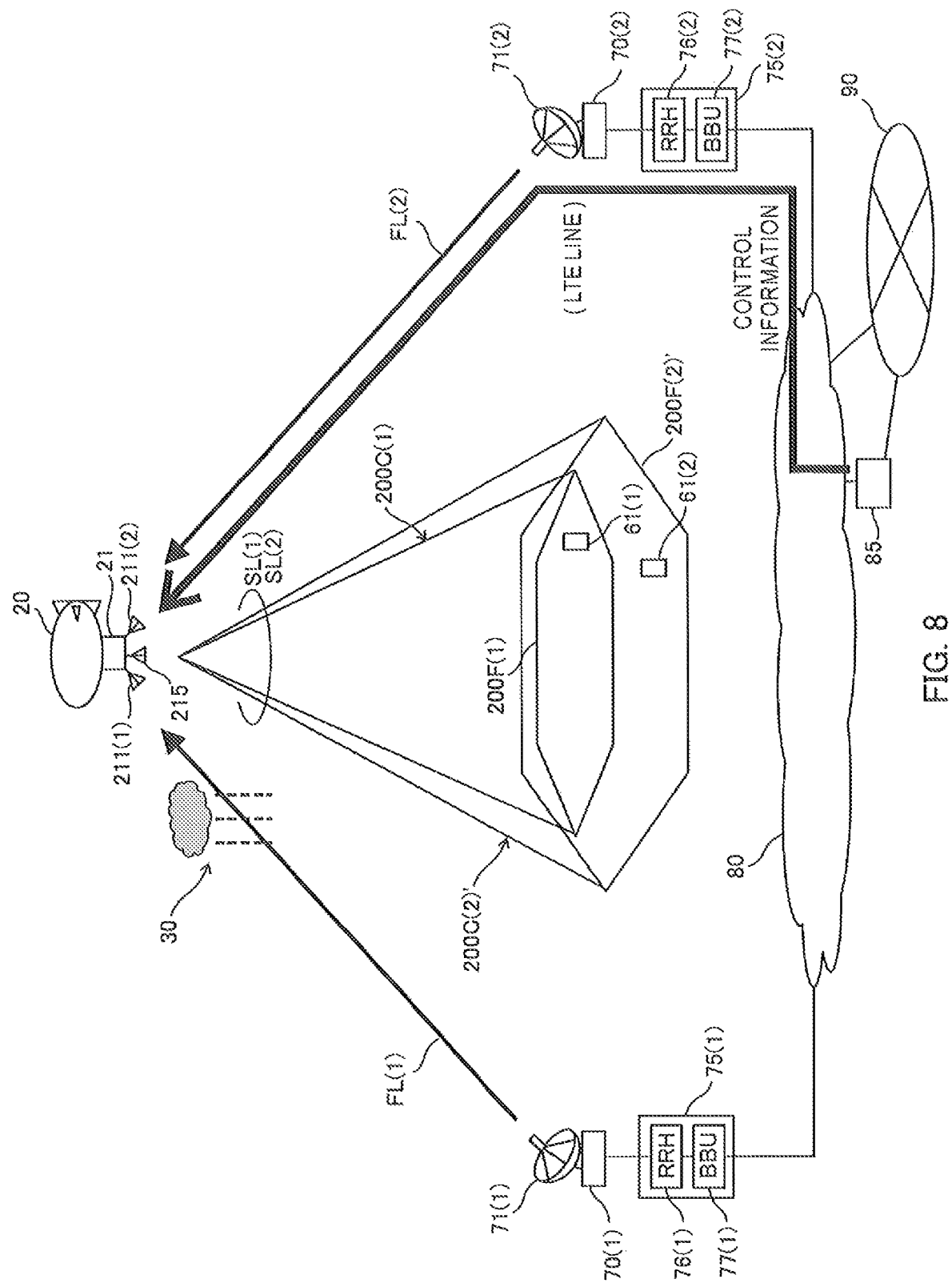
FIG. 8 is an illustration showing an example of a cell shape change of a second cell in the control example of FIG. 6.

Next, based on the acquired monitoring information, for example, when the local rainfall 30 occurs in the radio propagation path of the feeder link FL(1) with the first GW station 70(1) corresponding to the first cell 200C(1) and the radio communication quality of the feeder link FL(1) is deteriorated due to an increase in signal attenuation by the local rainfall 30, or when the deterioration of the radio communication quality is predicted, the central control server 85 transmits control information instructing the shape change of the second cell 200C(2) to the relay communication station 21 of the HAPS 20 (step S102, see FIG. 8).

For example, as shown in FIG. 8, the central control server 85 transmits control information instructing a beam former control to change the shape of the second cell 200C(2), to the relay communication station 21 of the HAPS 20, so that the second cell 200C(2) corresponding to the feeder link FL(2), in which the radio communication quality is not deteriorated or the deterioration of the radio communication quality is not predicted, covers the entire first cell 200C(1) corresponding to the feeder link FL(1) in which the radio communication quality is deteriorated or the deterioration of the radio communication quality is predicted.

The control section 224 of the relay communication station 21 of the HAPS 20 controls the service-link communication section 222 so as to change gradually the shape (range) of the second cell 200C(2) and to perform a beam former control for covering the entire first cell 200C(1) with the second cell 200C(2)', based on the control information received from the central control server 85 (S102). By this control, the entire footprint 200F(1) of the first cell 200C(1) is covered by the footprint 200F(2)' of the second cell 200C(2)'.

Figure 9:
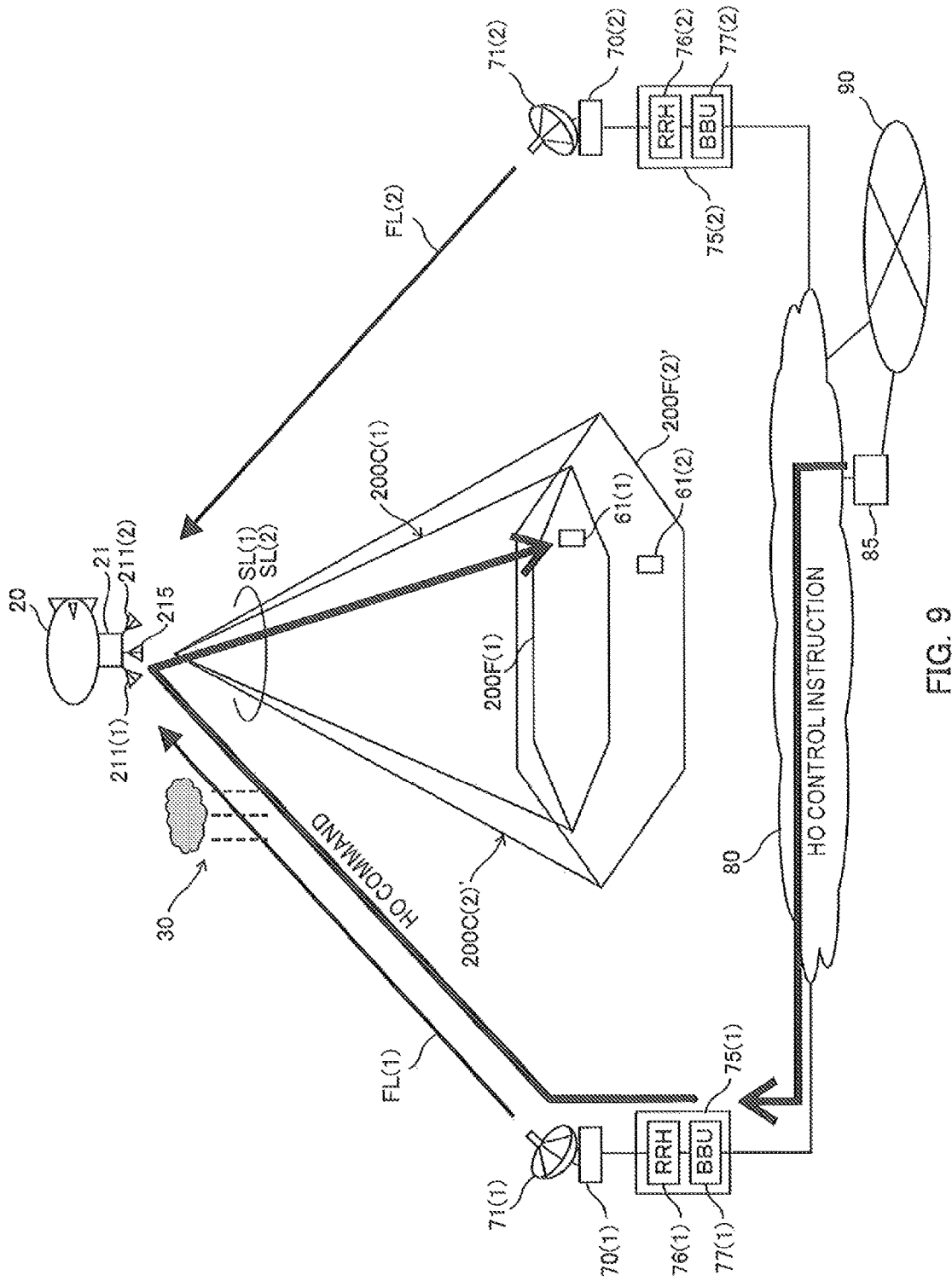
FIG. 9 is an illustration showing an example of a handover control from the first cell to the second cell in the control example of FIG. 6.

Next, after the shape change of the second cell 200C(2)' by the HAPS 20 is completed, a handover control is executed to perform a handover form the first cell 200C(1) to the second cell 200C(2)' for the terminal apparatus 61(1) located in the first cell 200C(1) (S103). For example, as shown in FIG. 9, the central control server 85 transmits a HO control instruction for instructing the foregoing handover control to the first base station 75(1) of the first cell 200C(1). The BBU 77(1) of the first base station 75(1) transmits a handover (HO) request to the second base station 75(2) of the second cell 200C(2) via, for example, the S1 interface, and transmits a handover (HO) command (for example, RRC Connection Reconfiguration in the LTE) to the terminal apparatus 61(1) in a state of connecting to the first cell 200C(1) (for example, RRC Connected state in the LTE) via the relay communication station 21 of the HAPS 20. Upon receiving the HO command, a synchronization process between the terminal apparatus 61(1) and the second base station 75(2) of the second cell 200C(2) and a path switching process by MME and S/P-GW of the core network 80 are performed, and the handover process is completed.

It is noted that, in case that the plural terminal apparatuses 61(1) are located in the first cell 200C(1), in order to avoid a sudden increase in load on the base stations 75(1) and 75(2), the feeder links FL(1) and FL(2), etc., instead of performing each handover for the plural terminal apparatuses 61(1) on the same time, each terminal apparatus 61(1) may be sequentially handed over to the second cell 200C(2)' while staggering the time.

Figure 10:
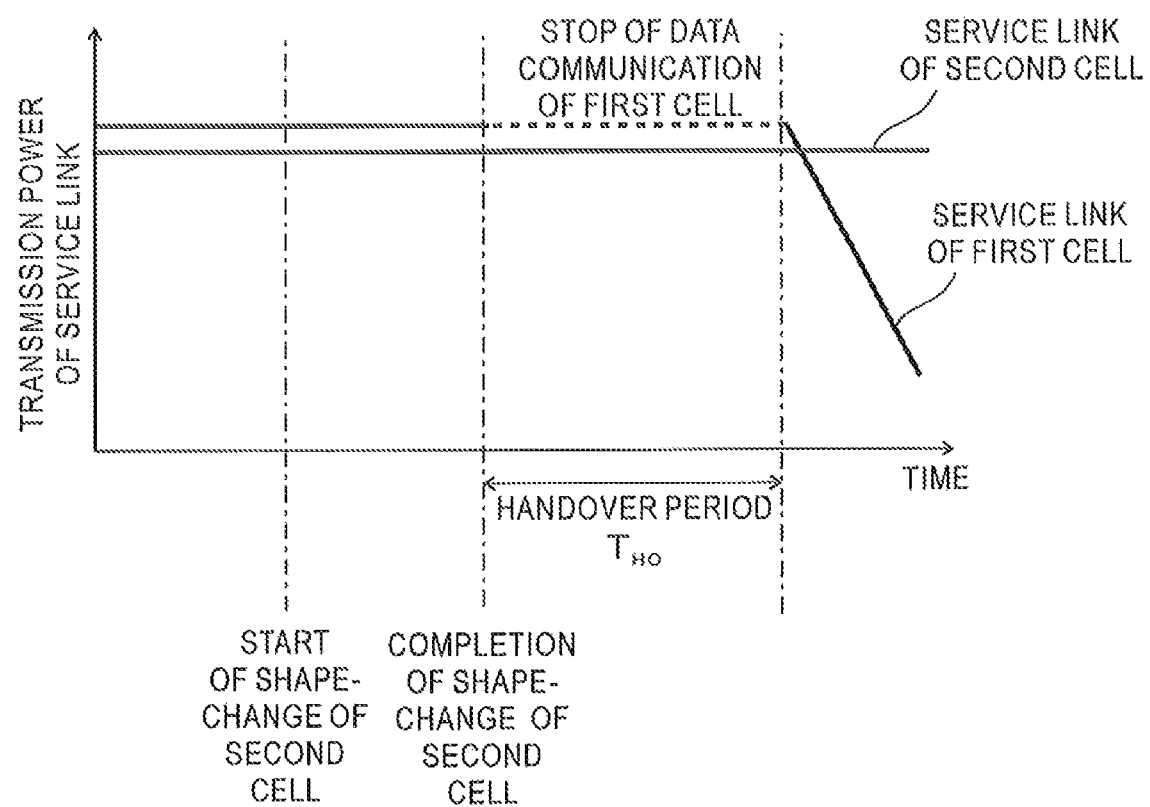
FIG. 10 is an illustration showing an example of a time change of service-link transmission power in the control example of FIG. 6.

Further, when another terminal apparatus located in the first cell 200C(1) performs a data communication in a period (hereinafter referred to as "handover period") $T_{HO}$ during the process of handover for the terminal apparatus 61(1) located in the first cell 200C(1) to the second cell 200C(2), the data communication may interfere with the HO command. Therefore, a data communication (data channel communication) unrelated to the handover sequence in the service link SL(1) of the first cell 200C(1) may be stopped in the handover period $T_{HO}$ as shown in FIG. 10. By stopping the data communication of the terminal apparatus, the interference with the HO command can be suppressed.

Figure 11:
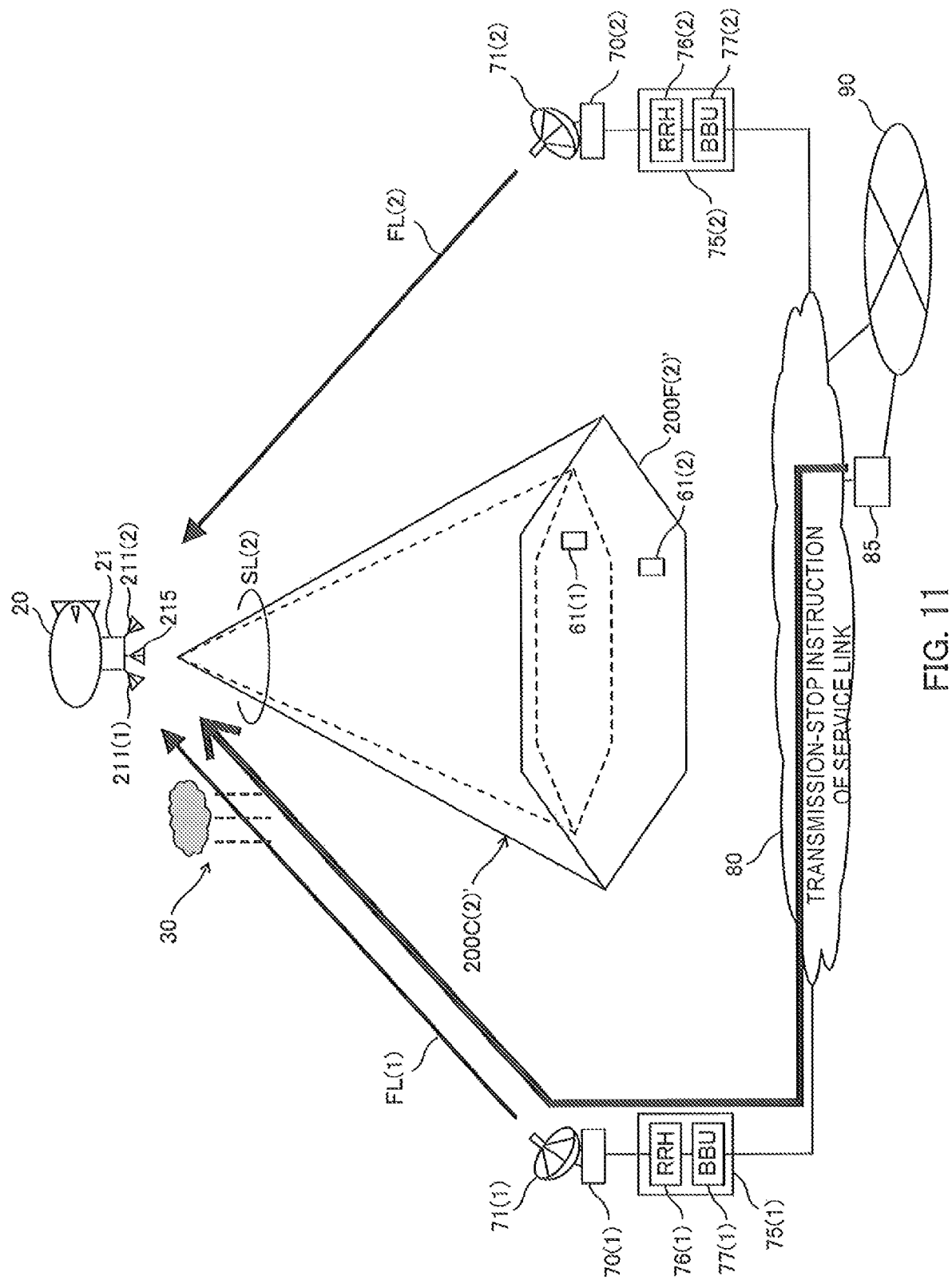
FIG. 11 is an illustration showing an example of a service-link transmission stop of a handover source cell in the control example of FIG. 6.

Next, after the handover of the terminal apparatus 61(1) (if plural terminal apparatuses were located in the cell, all of them) located in the first cell 200C(1) to the second cell 200C(2)' is completed, the central control server 85 transmits control information for instructing the transmission stop of the service link SL(1) of the first cell 200C(1), to the relay communication station 21 of the HAPS 20 (S104, see FIG. 11). The relay communication station 21 stops the transmission of the service link SL(1) of the first cell 200C(1) based on the control information received from the central control server 85. By stopping this transmission, it is possible to reduce a power consumption of the relay communication station 21 and prevent an interference with the second cell 200C(2)'.

It is noted that, in case of performing the transmission stop of the service link SL(1) of the first cell 200C(1), the transmission of the feeder link FL(1) from the first GW station 70(1) corresponding to the first cell 200C(1) to the relay communication station 21 of the HAPS 20 may be stopped, or the transmission may be continued as it is. In case of continuing the transmission of the feeder link FL(1) with the first GW station 70(1), the relay communication station 21 of the HAPS 20 can continue to measure and monitor the reception level of the feeder link FL(1) in real time, so that the original cell configuration (for example, see FIG. 1 and FIG. 7) can be restored immediately after the local rainfall 30 is over.

After that, when the reception level of the feeder link FL(1) is restored to a predetermined level by monitoring the relay communication station 21 of the HAPS 20, or when the recovery of the reception level is expected based on the weather forecast information, or the like, the central control server 85 returns to the initial state by the reverse procedures of S102 to S104 in FIG. 6. For example, the central control server 85 executes a control so as to resume the transmission of the service link SL(1) of the first cell 200C(1), perform a handover for the terminal apparatus 61(1) located in the first cell 200C(1) from the second cell 200C(2)' to the first cell 200C(1), return the shape of the second cell 200C(2)' to the original shape of the second cell 200C(2), and return to the initial state shown in FIG. 1.

As described above, according to the control examples in FIG. 6 to FIG. 11, when the radio communication quality of the feeder link FL(1) with the first GW station 70(1) is deteriorated due to the local rainfall 30 or the like, or when the deterioration of the radio communication quality is predicted, the communication quality of the service link SL(1) between the terminal apparatus 61(1) and the HAPS 20 can be maintained, by changing the shape of the second cell 200C(2), in which the radio communication quality is not deteriorated, so as to include the part or the whole of the first cell 200C(1), and performing a handover to the second cell 200C(2)' after the shape change for the terminal apparatus 61(1) that is located in the first cell 200C(1) and connected to the first cell 200C(1).

Figure 12:
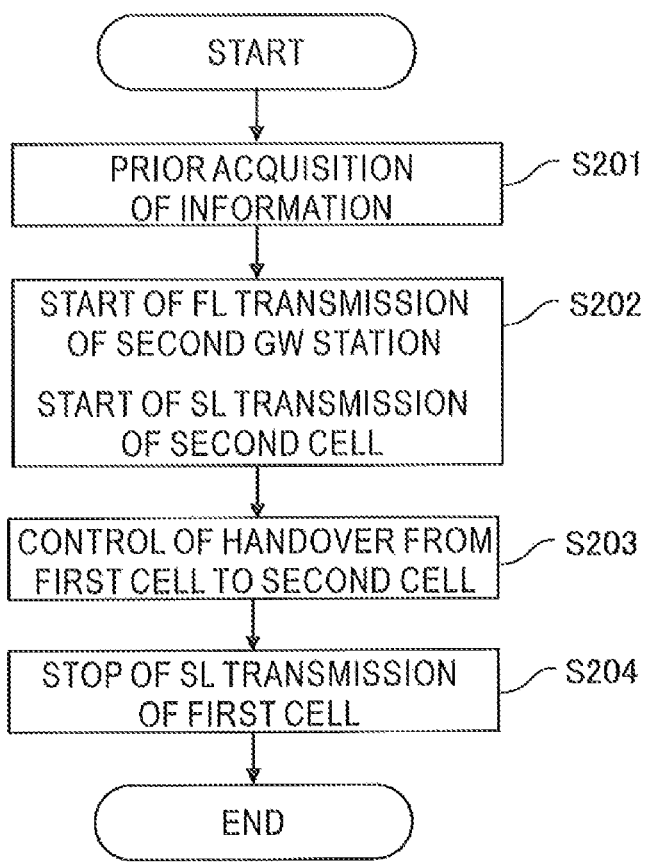
FIG. 12 is a flowchart showing an example of a switching control of a GW station in a HAPS according to another embodiment.

FIG. 12 is a flowchart showing an example of a switching control of a GW station in a HAPS according to another embodiment. In is noted that, although the switching control of the GW station in the HAPS 20 is performed remotely from the central control server 85 in the example of FIG. 12, the HAPS 20 itself may autonomously perform the switching control.

Figure 13:
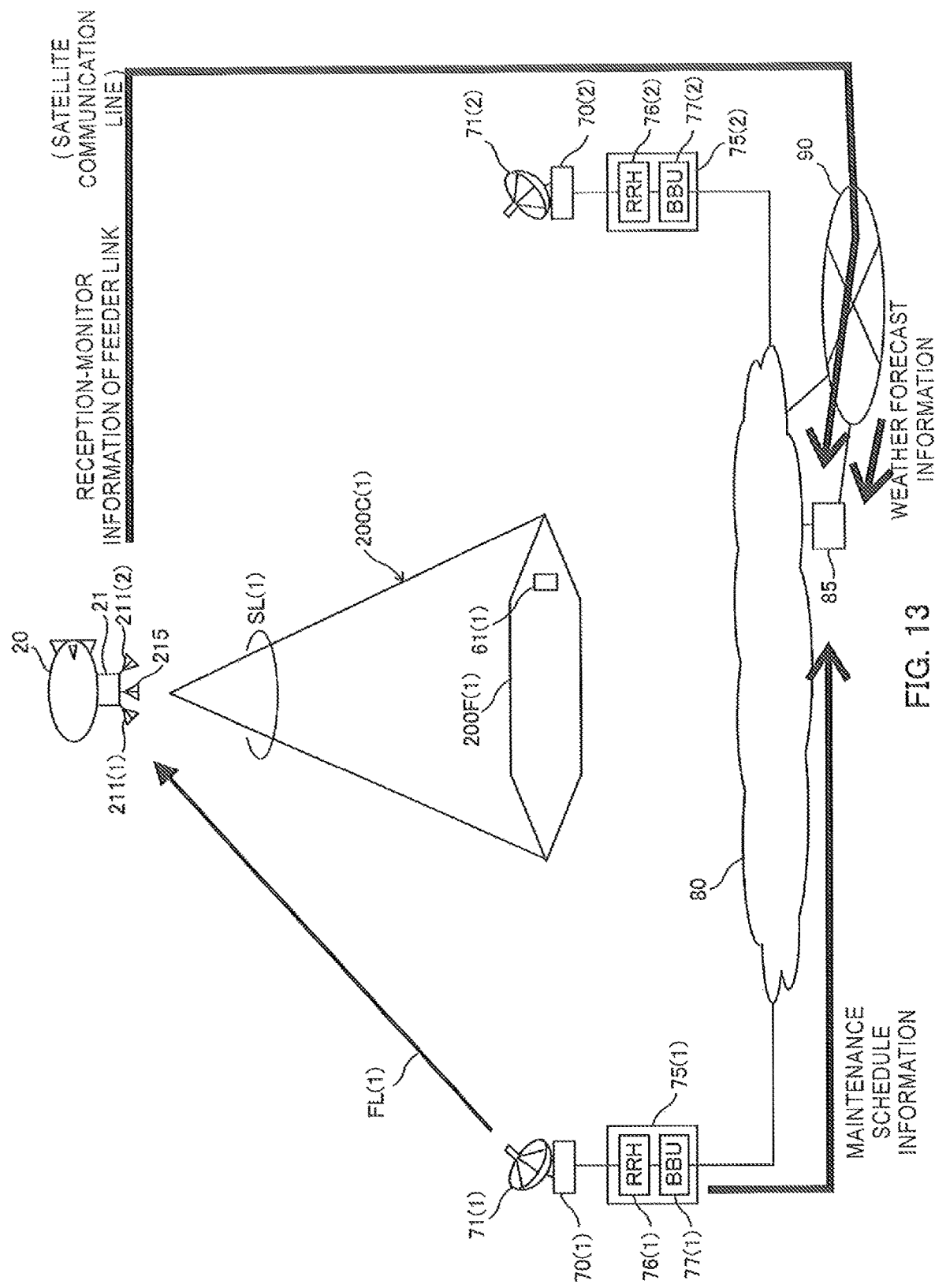
FIG. 13 is an illustration showing an example of a prior acquisition of information in the control example of FIG. 12.

In FIG. 12, the central control server 85 acquires monitoring information regarding the communication quality of the feeder link FL(1) by the first GW station 70(1) for normal use, which is exemplified in the following (J1) to (J3), regularly or irregularly at a predetermined timing (S201, see FIG. 13).

(J1) Weather forecast information for the area including the radio propagation path of the feeder link FL(1)

(J2) Maintenance schedule information of the first GW station 70(1) and the first base station 75(1)

(J3) Reception-level monitoring information of the feeder link FL(1) with the first GW station 70(1), which is measured by the HAPS 20

Figure 14:
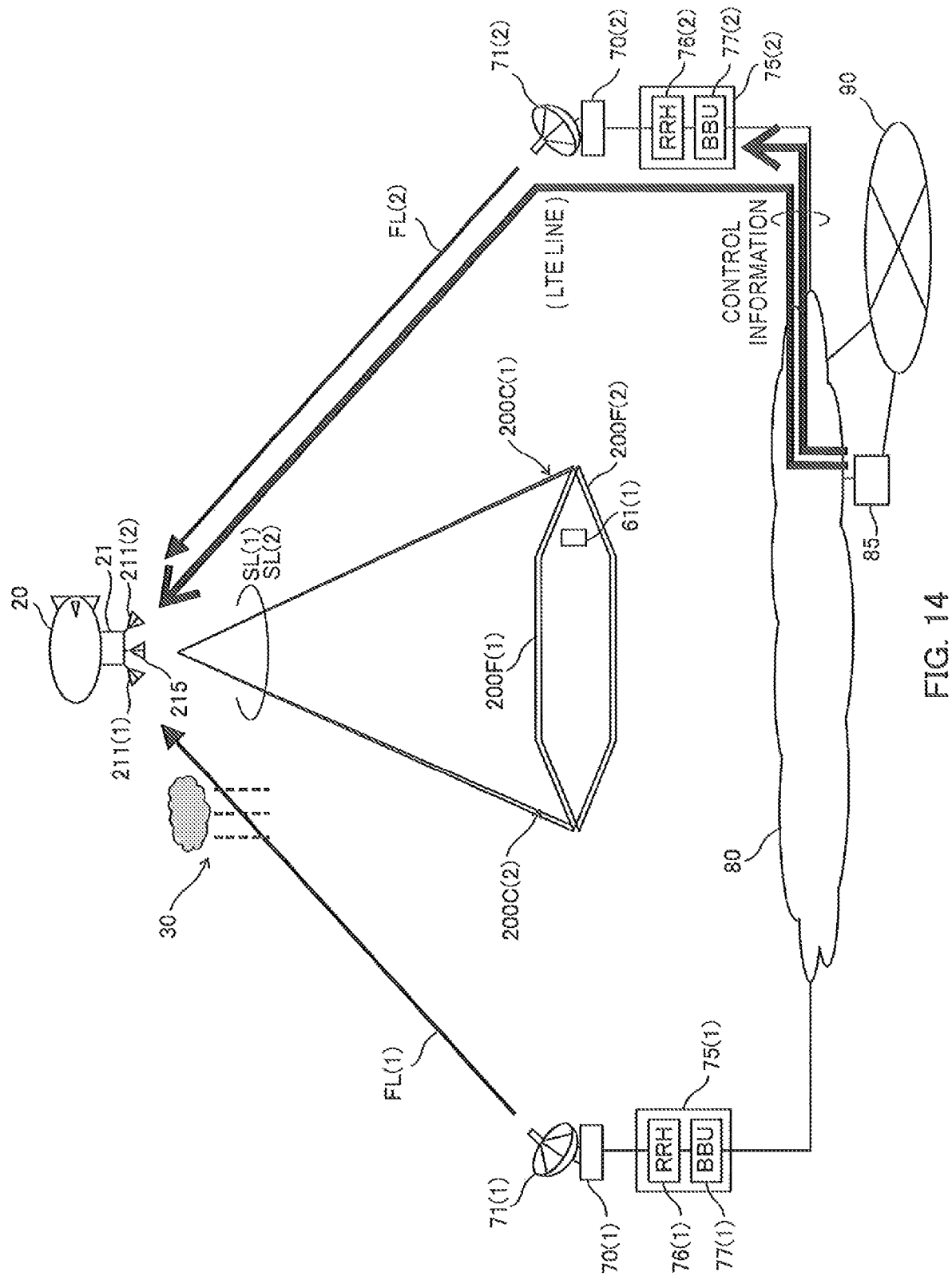
FIG. 14 is an illustration showing an example of a switching from a normally used first GW station to the second GW station for backup in the control example of FIG. 12.

Next, based on the above-mentioned acquired monitoring information, for example, when the local rainfall 30 occurs in the radio propagation path of the feeder link FL(1) with the first GW station 70(1) corresponding to the first cell 200C(1) and the radio communication quality of the feeder link FL(1) is deteriorated due to the increase in signal attenuation due to the rainfall 30, or when the deterioration of the radio communication quality is predicted, the central control server 85 transmits control information for executing an activation process to perform a switching from the first GW station 70(1) for normal use to the second GW station 70(2) for backup, and a transmission for the feeder link FL(2) for backup and the service link SL(2) for backup, to the relay communication station 21 of the HAPS 20 and the second base station 75(2) (step S202, see FIG. 14).

The second base station 75(2), based on the control information received from the central control server 85, establishes a communication line between the relay communication station 21 of the HAPS 20 and the second base station 75(2), and starts a transmission of the feeder link FL(2) from the second GW station 70(2) to the relay communication station 21.

Further, the control section 224 of the relay communication station 21 of the HAPS 20, based on the control information received from the central control server 85, controls a beam former for forming the second cell 200C(2) in which the footprint 200F(2) overlaps the footprint 200F (1) of the first cell 200C(1), and controls the service-link communication section 222 so as to start a transmission of the service link SL(2) of the second cell 200C(2).

Figure 15:
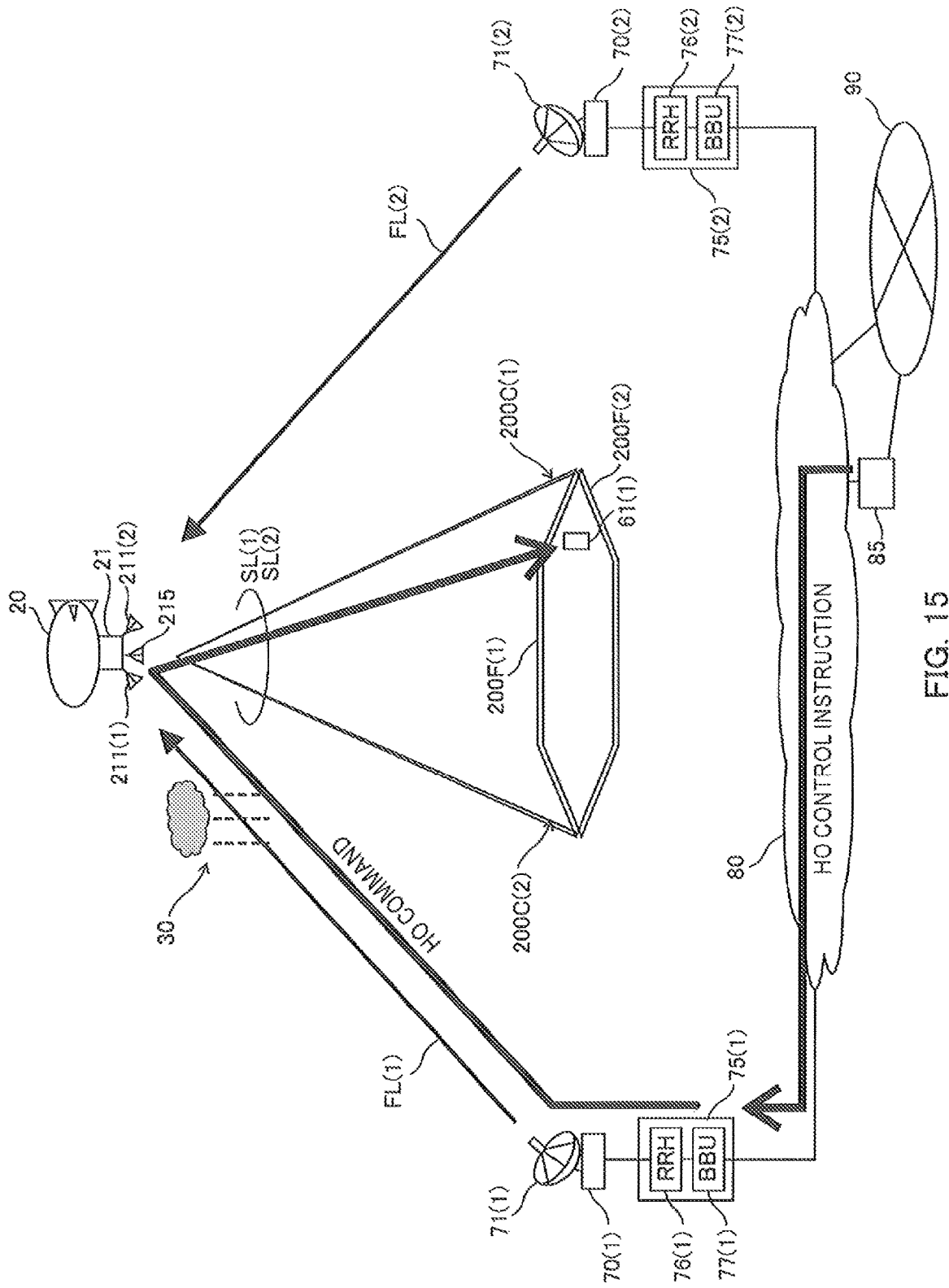
FIG. 15 is an illustration showing an example of a handover control from a first cell to a second cell in the control example of FIG. 12.

Next, after the activation processing of the second base station 75(2) for backup, the second GW station 70(2), the feeder link FL(2) and the service link SL(2) is completed, a handover control is executed to perform a handover from the first cell 200C(1) to the second cell 200C(2) for the terminal apparatus 61(1) located in the first cell 200C(1) (S203). For example, as shown in FIG. 15, the central control server 85 transmits a HO control instruction for instructing the foregoing handover control to the first base station 75(1) of the first cell 200C(1). The BBU 77(1) of the first base station 75(1) transmits a handover (HO) request to the second base station 75(2) of the second cell 200C(2) via, for example, the S1 interface, and transmits a handover (HO) command (for example, RRC Connection Reconfiguration in the LTE) to the terminal apparatus 61(1) in a state of connecting to the first cell 200C(1) (for example, RRC Connected state in the LTE) via the relay communication station 21 of the HAPS 20. Upon receiving the HO command, a synchronization process between the terminal apparatus 61(1) and the second base station 75(2) of the second cell 200C(2) and a path switching process by MME and S/P-GW of the core network 80 are performed, and the handover process is completed.

It is noted that, in case that the plural terminal apparatuses 61(1) are located in the first cell 200C(1), in order to avoid a sudden increase in load on the base stations 75(1) and 75(2), the feeder links FL(1) and FL(2), etc., instead of performing each handover for the plural terminal apparatuses 61(1) on the same time, each terminal apparatus 61(1) may be sequentially handed over to the second cell 200C(2) while staggering the time.

Further, when another terminal apparatus located especially in the second cell 200C(2) performs a data communication in a period (hereinafter referred to as "handover period") $T_{HO}$ during the process of handover for the terminal apparatus 61(1) located in the first cell 200C(1) to the second cell 200C(2), the data communication may interfere with the HO command. Therefore, a communication (data channel communication) of user data signals unrelated to the handover sequence in the service link SL(1) and the service link SL(2) of the first cell 200C(1) and the second cell 200C(2) may be stopped in the handover period $T_{HO}$ as shown in FIG. 10 described above. By stopping the communication of user data signals of the terminal apparatus, the interference with the HO command can be suppressed.

Figure 16:
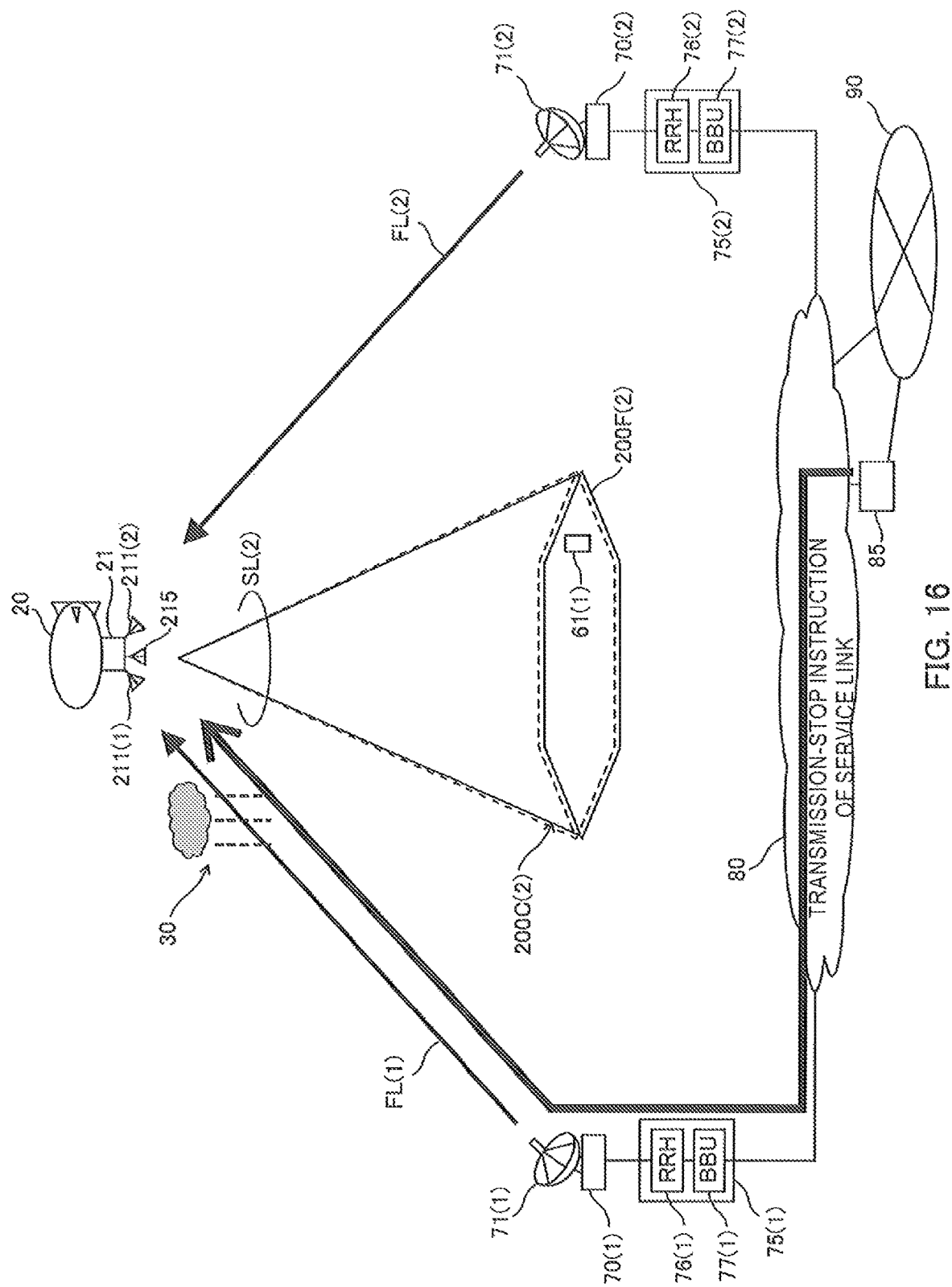
FIG. 16 is an illustration showing an example of a service-link transmission stop of a handover source cell in the control example of FIG. 12.

Next, after the handover of the terminal apparatus 61(1) (if plural terminal apparatuses were located in the cell, all of them) in the first cell 200C(1) to the second cell 200C(2) is completed, the central control server 85 transmits control information for instructing the transmission stop of the service link SL(1) of the first cell 200C(1), to the relay communication station 21 of the HAPS 20 (S204, see FIG. 16). The relay communication station 21 stops the transmission of the service link SL(1) of the first cell 200C(1) based on the control information received from the central control server 85. By stopping this transmission, it is possible to reduce a power consumption of the relay communication station 21 and prevent an interference with the second cell 200C(2) after switching.

It is noted that, in case of performing the transmission stop of the service link SL(1) of the first cell 200C(1), the transmission of the feeder link FL(1) from the first GW station 70(1) corresponding to the first cell 200C(1) to the relay communication station 21 of the HAPS 20 may be stopped, or the transmission may be continued as it is. In case of continuing the transmission of the feeder link FL(1) with the first GW station 70(1), the relay communication station 21 of the HAPS 20 can continue to measure and monitor the reception level of the feeder link FL(1) in real time, so that the original cell configuration (for example, see FIG. 13) can be restored immediately after the local rainfall 30 is over.

After that, when the reception level of the feeder link FL(1) is restored to a predetermined level by monitoring the relay communication station 21 of the HAPS 20, or when the recovery of the reception level is expected based on the weather forecast information, or the like, the central control server 85 returns to the initial state by the reverse procedures of S202 to S204 in FIG. 12. For example, the central control server 85 executes a control so as to resume the transmission of the service link SL(1) in the first cell 200C(1), perform a handover for the terminal apparatus 61(1) located in the first cell 200C(1) from the second cell 200C(2) for backup to the first cell 200C(1) for normal use, switch from the second GW station 70(2) for backup to the first GW station 70(1) for normal use, stop the transmission of the feeder link FL(2) for backup and the service link SL(2) and the formation of the second cell 200C(2), and restore the initial state shown in FIG. 13.

As described above, according to the control examples in FIG. 12 to FIG. 16, when the radio communication quality of the feeder link FL(1) with the first GW station 70(1) is deteriorated due to the local rainfall 30 or the like, or when the deterioration of the radio communication quality is predicted, the communication quality of the service link SL(1) between the terminal apparatus 61(1) and the HAPS 20 can be maintained, by switching from the first GW station 70(1) for normal use to the second GW station 70(2) for backup, and by performing a handover to the second cell 200C(2) corresponding to the second GW station 70(2) after switching, for the terminal apparatus 61(1) that is located in the first cell 200C(1) and connected to the first cell 200C(1).

As described above, according to the present embodiment, it is possible to suppress the deterioration of the communication quality of the service link, which is caused by the increase of signal attenuation in the propagation path of the feeder link between the HAPS 20 and the GW station 70.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station, the base station apparatus, RRH and BBU described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20 HAPS (communication relay apparatus)
21 relay communication station
30 rainfall
61, 61(1), 61(2) terminal apparatus
70(1), 70(2) gateway station (GW station)
71(1), 71(2) antenna for feeder link (GW antenna)
75, 75(1), 75(2) base station
76(1), 76(2) remote radio head (RRH)
77(1), 77(2) base band unit (BBU)
200C, 200C(1), 200C(2) three dimensional cell
200F, 200F(1), 200F(2) foot print
211, 211(1), 211(2) antenna for feeder link (FL antenna)
215 antenna for service link (SL antenna)
221 feeder-link communication section
222 service-link communication section
223 frequency conversion section

The invention claimed is:

1. A remote control apparatus for remotely controlling a communication relay apparatus having a feeder-link communication section that performs a feeder-link radio communication with each of a first gateway station and a second gateway station corresponding to each of a first cell and a second cell adjacent to each other, a service-link communication section that performs a radio communication with a terminal apparatus in each service link of the first cell and the second cell, and a control section that controls the service-link communication section so that a shape of the second cell is changed to include a whole of the first cell when a deterioration of a radio communication quality of the feeder link with the first gateway station corresponding to the first cell is predicted, the control section performing a control based on the control information received by the control-information receiving section, the remote control apparatus comprising:
    an information acquisition section that acquires at least one of weather forecast information on an area including the propagation path of the feeder link with the first gateway station, maintenance schedule information of the first gateway station, monitoring information including a reception level of the feeder link with the first gateway station, flight path information on the communication relay apparatus, position information on the communication relay apparatus, and attitude information on the communication relay apparatus;
    a control-information generating section that, in response to the deterioration of the radio communication quality of the feeder link between the communication relay apparatus and the first gateway station being predicted, generates control information for controlling the feeder-link communication section and the service-link communication section based on the information acquired by the information acquisition section; and
    a control-information transmitting section that transmits the control information to the communication relay apparatus.

2. A communication system, comprising:
    a communication relay apparatus having a feeder-link communication section that performs a feeder-link radio communication with each of a first gateway station and a second gateway station corresponding to each of a first cell and a second cell adjacent to each other, a service-link communication section that performs a radio communication with a terminal apparatus in each service link of the first cell and the second cell, and a control section that controls the service-link communication section so that a shape of the second cell is changed to include a whole of the first cell when a deterioration of a radio communication quality of the feeder link with the first gateway station corresponding to the first cell is predicted, the control section performing a control based on the control information received by the control-information receiving section; and a remote control apparatus for remotely controlling the communication relay apparatus having an information acquisition section that acquires at least one piece of weather forecast information on an area including the propagation path of the feeder link with the first gateway station, maintenance schedule information of the first gateway station, and monitoring information including a reception level of the feeder link with the first gateway station, a control-information generating section that, in response to the deterioration of the radio communication quality of the feeder link between the communication relay apparatus and the first gateway station being predicted, generates control information for controlling the feeder-link communication section and the service-link communication section based on the information acquired by the information acquisition section, and a control-information transmitting section that transmits the control information to the communication relay apparatus.

3. The communication system according to claim 2, further comprising a first base station connected to the first gateway station, and a second base station connected to the second gateway station.

4. The communication system according to claim 3, wherein the first base station and the second base station perform a process of handing over plural terminal apparatuses connected to the first cell to the second cell in order, after the change of the shape of the second cell is completed or after the feeder link communication between the communication relay apparatus and the second gateway station is started.

5. The communication system according to claim 4, wherein the first base station and the second base station stop a communication of a user data signal with the terminal apparatus during a processing period of the handover.

6. A remote control apparatus for remotely controlling the communication relay apparatus having a feeder-link communication section that performs a radio communication with a first gateway station and a second gateway station corresponding to each of a first cell and a second cell formed in a common area, a footprint of the second cell overlapping a footprint of the first cell as a whole, a service-link communication section that performs a radio communication with a terminal apparatus in at least one of the service links of the first cell and the second cell in the common area, a control section that controls the feeder-link communication section so as to start a communication with the second gateway station when a deterioration of a radio communication quality of the feeder link with the first gateway station is predicted in a status of stopping the communication with the second gateway station, and a control-information receiving section that receives control information from a remote control apparatus and performs a control based on the control information received by the control-information receiving section, the remote control apparatus comprising:

an information acquisition section that acquires at least one of weather forecast information on an area including the propagation path of the feeder link with the first gateway station, maintenance schedule information of the first gateway station, monitoring information including a reception level of the feeder link with the first gateway station, flight path information on the communication relay apparatus, position information on the communication relay apparatus, and attitude information on the communication relay apparatus;

a control-information generating section that, in response to the deterioration of the radio communication quality of the feeder link between the communication relay apparatus and the first gateway station being predicted, generates control information for controlling the feeder-link communication section and the service-link communication section based on the information acquired by the information acquisition section; and a control-information transmitting section that transmits the control information to the communication relay apparatus.

7. A communication system, comprising:

a communication relay apparatus having a feeder-link communication section that performs a radio communication with a first gateway station and a second gateway station corresponding to each of a first cell and a second cell formed in a common area, a footprint of the second cell overlapping a footprint of the first cell as a whole, a service-link communication section that performs a radio communication with a terminal apparatus in at least one of the service links of the first cell and the second cell in the common area, a control section that controls the feeder-link communication section so as to start a communication with the second gateway station when a deterioration of a radio communication quality of the feeder link with the first gateway station is predicted in a status of stopping the communication with the second gateway station, and a control-information receiving section that receives control information from a remote control apparatus and performs a control based on the control information received by the control-information receiving section; and a remote control apparatus for remotely controlling the communication relay apparatus having an information acquisition section that acquires at least one piece of weather forecast information on an area including the propagation path of the feeder link with the first gateway station, maintenance schedule information of the first gateway station, and monitoring information including a reception level of the feeder link with the first gateway station, a control-information generating section that, in response to the deterioration of the radio communication quality of the feeder link between the communication relay apparatus and the first gateway station being predicted, generates control information for controlling the feeder-link communication section and the service-link communication section based on the information acquired by the information acquisition section, and a control-information transmitting section that transmits the control information to the communication relay apparatus.

8. The communication system according to claim 7, further comprising a first base station connected to the first gateway station, and a second base station connected to the second gateway station.

9. The communication system according to claim 7, wherein the first base station and the second base station perform a process of handing over plural terminal apparatuses connected to the first cell to the second cell in order, after the change of the shape of the second cell is completed or after the feeder link communication between the communication relay apparatus and the second gateway station is started.

* * * * *